US012728417B2

(12) United States Patent
Uno et al.

(10) Patent No.: US 12,728,417 B2
(45) Date of Patent: Sep. 8, 2026

(54) PARTICLE SORTING KIT

(71) Applicant: Sony Group Corporation, Tokyo (JP)

(72) Inventors: Taiki Uno, Kanagawa (JP); Tatsumi Ito, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 225 days.

(21) Appl. No.: 18/278,067

(22) PCT Filed: Feb. 22, 2022

(86) PCT No.: PCT/JP2022/007095
§ 371 (c)(1),
(2) Date: Aug. 21, 2023

(87) PCT Pub. No.: WO2022/185980
PCT Pub. Date: Sep. 9, 2022

(65) Prior Publication Data
US 2024/0142369 A1 May 2, 2024

(30) Foreign Application Priority Data
Mar. 3, 2021 (JP) ................................ 2021-033245

(51) Int. Cl.
*B01L 3/00* (2006.01)
*G01N 15/14* (2006.01)
(Continued)

(52) U.S. Cl.
CPC ... *B01L 3/502753* (2013.01); *B01L 3/502761* (2013.01); *G01N 15/1459* (2013.01);
(Continued)

(58) Field of Classification Search
CPC ........... G01N 15/1484; G01N 15/1459; G01N 37/00; G01N 2015/1028; B01L 3/502753;
(Continued)

(56) References Cited

U.S. PATENT DOCUMENTS 5,601,728 A * 2/1997 Kayal .................... B01D 35/00 210/768
2007/0240777 A1 10/2007 Sasano et al.
2013/0228530 A1 9/2013 Carlo et al.

FOREIGN PATENT DOCUMENTS

JP S58083233 A 5/1983
JP 2005-315834 A 11/2005
(Continued)

OTHER PUBLICATIONS

International Search Report and English translation thereof mailed Apr. 5, 2022 in connection with International Application No. PCT/JP2022/007095.

*Primary Examiner* — Benjamin R Schmitt
(74) *Attorney, Agent, or Firm* — Wolf, Greenfield & Sacks, P.C.

(57) ABSTRACT

There is provided a particle sorting kit including a filter unit, which has a small amount of particle loss at a connection portion between a tube through which a sample liquid flows and the filter unit and functions even at a low flow rate. The particle sorting kit includes a sample accommodation unit for accommodating a sample liquid containing particles, a sample flow path through which the sample liquid flows, a detection region in which a target particle is detected from the sample liquid, and a filter unit including a filter and a fitting portion that fits to an outer diameter of a tube for connection with the sample accommodation unit and/or the sample flow path, in which the fitting portion includes a protrusion that protrudes in the tube direction.

11 Claims, 14 Drawing Sheets

(51) Int. Cl.
*G01N 37/00* (2006.01)
*G01N 15/10* (2006.01)

(52) U.S. Cl.
CPC ......... *G01N 15/1484* (2013.01); *G01N 37/00* (2013.01); *B01L 2200/0652* (2013.01); *B01L 2200/16* (2013.01); *B01L 2300/0663* (2013.01); *B01L 2300/0681* (2013.01); *B01L 2300/087* (2013.01); *G01N 2015/1028* (2024.01)

(58) Field of Classification Search
CPC ....... B01L 3/502761; B01L 2200/0652; B01L 2200/16; B01L 2300/0663; B01L 2300/0681; B01L 2300/087
See application file for complete search history.

(56) References Cited

FOREIGN PATENT DOCUMENTS

| | | | |
|---|---|---|---|
| JP | 2007-107680 | A | 4/2007 |
| JP | 2010-230629 | A | 10/2010 |
| JP | 2014-070720 | A | 4/2014 |
| JP | 2017-058375 | A | 3/2017 |
| JP | 2018-124143 | A | 8/2018 |

* cited by examiner

A

B

PARTICLE SORTING KIT

CROSS-REFERENCE TO RELATED APPLICATIONS

This application claims the benefit under 35 U.S.C. § 371 as a U.S. National Stage Entry of International Application No. PCT/JP2022/007095, filed in the Japanese Patent Office as a Receiving Office on Feb. 22, 2022, which claims priority to Japanese Patent Application Number JP2021-033245, filed in the Japanese Patent Office on Mar. 3, 2021, each of which is hereby incorporated by reference in its entirety.

TECHNICAL FIELD

The present technology relates to a particle sorting kit used when sorting particles using a microchip provided with a microchannel.

BACKGROUND ART

Currently, a technology referred to as flow cytometry is used for analyzing microparticles such as cells and microorganisms. This flow cytometry is an analysis method for analyzing and sorting microparticles by irradiating the microparticles flowing so as to be included in a sheath flow fed into a flow path with light and detecting fluorescence and scattered light emitted from each microparticle. A device used for this flow cytometry is called as a flow cytometer.

In this flow cytometer, a microchip obtained by providing an area or a flow path for performing chemical or biological analysis on a substrate of silicon or glass is used. An analysis system using such microchip is referred to as a micro-total-analysis system (μ-TAS), a lab-on-chip, a biochip and the like.

As an example of application of μ-TAS to a microparticle measurement technology, there is a particle sorting device that optically, electrically, or magnetically measures characteristics of the microparticles to sort in the flow path or area arranged on the microchip. Such flow cytometer (microchip type flow cytometer) to which μ-TAS is applied has an advantage that cross contamination of samples between measurements and the like can be prevented by forming a flow path system using the microchip.

For example, Patent Document 1 discloses "a microchip provided with a main flow path through which a liquid containing microparticles flows, and a sorting flow path on which a capturing chamber into which the microparticles are captured and a pressure chamber in which a negative pressure is generated are arranged, the sorting flow path communicating with the main flow path, in which a cross section perpendicular to a flow direction of the liquid in the capturing chamber and the pressure chamber is formed to be larger than a cross section perpendicular to the flow direction of the liquid in another portion of the sorting flow path".

CITATION LIST

Patent Document

Patent Document 1: Japanese Patent Application Laid-Open No. 2017-058375

SUMMARY OF THE INVENTION

Problems to be Solved by the Invention

In a case where microparticles such as cells and microorganisms are analyzed and sorted, the presence of foreign matters such as aggregates of particles and fiber waste in a sample liquid leads to a cause of deterioration in analysis accuracy and sorting accuracy. Therefore, they are desirably removed before being allowed to flow through a microchannel. Then, since the sample liquid allowed to flow through the microchannel has a small amount and a small flow rate, a filter used for removing the foreign matters needs to function even at a small flow rate with a small loss amount of particles.

However, there is a problem that a gap is generated and a dead volume is generated at a connection portion between the tube through which the sample liquid flows and the filter unit, or workability is deteriorated due to holding failure of the tube at the connection portion.

Therefore, a main object of the present technology is to provide a particle sorting kit including a filter unit that has a small loss amount of particles at a connection portion between a tube through which a sample liquid flows and the filter unit and functions even at a small flow rate.

Solutions to Problems

In the present technology, first, there is provided a particle sorting kit including

- a sample accommodation unit that accommodates a sample liquid containing particles,
- a sample flow path through which the sample liquid flows,
- a detection region in which a target particle is detected from the sample liquid, and
- a filter unit including a filter and a fitting portion that fits to an outer diameter of a tube for connection with the sample accommodation unit and/or the sample flow path, in which
- the fitting portion includes a protrusion that protrudes in the tube direction.

The particle sorting kit according to the present technology can include, as the protrusion, a side surface side protrusion that protrudes in a side surface direction of the tube.

The particle sorting kit according to the present technology can include, as the protrusion, a connection surface side protrusion that protrudes in a direction of a connection end portion of the tube with the filter unit.

Furthermore, the particle sorting kit according to the present technology can also include, as the protrusion:

- a side surface side protrusion that protrudes in a side surface direction of the tube; and
- a connection surface side protrusion that protrudes in a direction of a connection end portion of the tube with the filter unit.

In the particle sorting kit according to the present technology, a configuration can be employed in which the side surface side protrusion is continuous in a longitudinal direction of the tube, and is located farther in a direction of a connection end portion of the tube with the filter unit with respect to an adhesive position at which the tube and the fitting portion are adhered.

In the particle sorting kit according to the present technology, the side surface side protrusion may be continuous in a longitudinal direction of the tube, and can include a gradient to narrow an inner diameter of the fitting portion toward a filter direction.

In this case, the gradient can include:

- a first gradient connected to an inner side surface of the fitting portion; and a second gradient connected to the first gradient and connected to a connection surface with the tube in the fitting portion.

Furthermore, a connecting portion between the first gradient and the second gradient can be rounded.

In the particle sorting kit according to the present technology, a plurality of the side surface side protrusions can be included in one of the fitting portions.

In the particle sorting kit according to the present technology, an opening communicating with the filter can be provided on a connection surface of the fitting portion with the tube, and the connection surface side protrusion can be provided on the entire circumference of the opening.

In the particle sorting kit according to the present technology, a contact portion of the connection surface side protrusion with the tube can be rounded.

In the present technology, "particles" may broadly include bio-related microparticles such as cells, microorganisms, and ribosomes, synthetic particles such as latex particles, gel particles, and industrial particles and the like.

The bio-related microparticles include chromosomes forming various cells, ribosomes, mitochondria, organelles (cell organelles) and the like. The cells include animal cells (for example, blood cells and the like) and plant cells. The microorganisms include bacteria such as *Escherichia coli*, viruses such as tobacco mosaic virus, fungi such as yeast and the like. Moreover, the bio-related microparticles also include bio-related polymers such as nucleic acids, proteins, and complexes thereof. In addition, the industrial particles may be, for example, an organic or inorganic polymer material, metal and the like. The organic polymer material includes polystyrene, styrene/divinylbenzene, polymethyl methacrylate and the like. The inorganic polymer material includes glass, silica, a magnetic material and the like. The metal includes gold colloid, aluminum and the like. In general, shapes of the microparticles are generally spherical, but in the present technology, they may be non-spherical, and its size, mass and the like are also not particularly limited.

BRIEF DESCRIPTION OF DRAWINGS

FIG. 5A is a conceptual view illustrating a state of the filter unit 14 and the tube 15 before connection, and FIG. 5B is a conceptual view illustrating a state in which the filter unit 14 and the tube 15 are connected.

MODES FOR CARRYING OUT THE INVENTION

Figure 1:
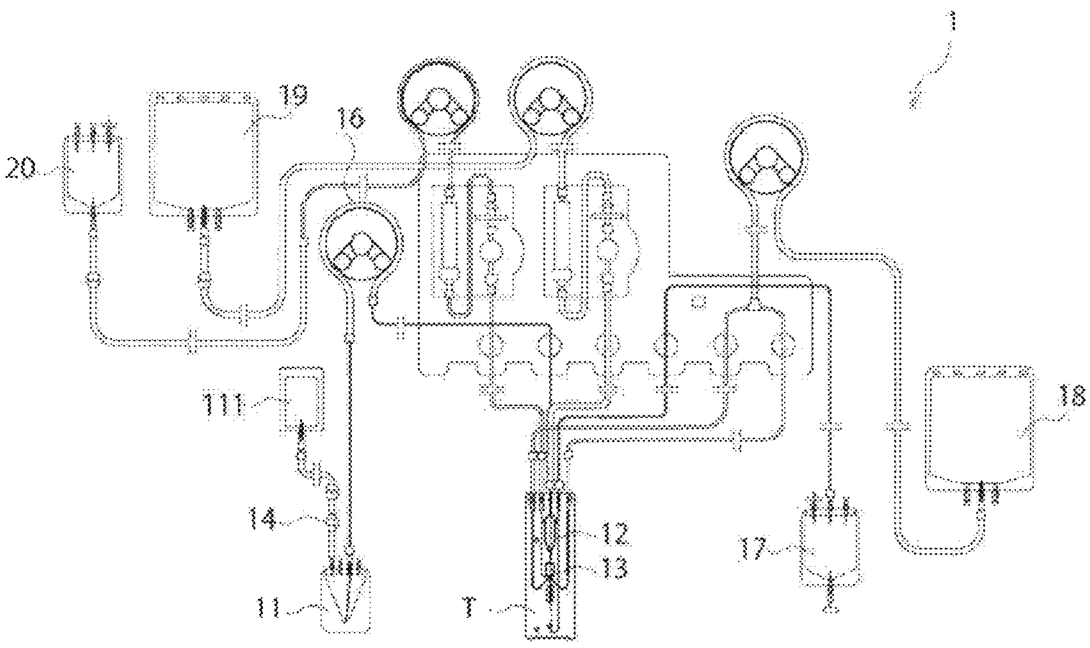
FIG. 1 is a conceptual diagram schematically illustrating a first embodiment of a particle sorting kit 1 according to the present technology.

Hereinafter, a preferred mode for carrying out the present technology is described with reference to the drawings.

An embodiment hereinafter described illustrates an example of a representative embodiment of the present technology, and the scope of the present technology is not narrowed by this. Note that description will be given in the following order.

1. Particle sorting kit 1
   - (1) Sample accommodation unit 11
   - (2) Sample flow path 12
   - (3) Detection region 13
   - (4) Filter unit 14
     - (4-1) Filter 141
     - (4-2) Fitting portion 142
     - (4-3) Tapered portion 143
   - (5) Tube pump unit 16
   - (6) Target particle accommodation unit 17
   - (7) Disposal unit 18

(8) Sheath liquid accommodation unit 19
(9) Gate liquid accommodation unit 20
2. Particle sorting device 2 and particle sorting system 3
(1) Particle sorting kit 1
(2) Light irradiation unit 21
(3) Light detection unit 22
(4) Information processing unit 23
(5) Storage unit 24
(6) Display unit 25
(7) User interface 26

1. Particle Sorting Kit 1

FIG. 1 is a conceptual diagram schematically illustrating a first embodiment of a particle sorting kit 1 according to the present technology. The particle sorting kit 1 according to the present technology includes at least a sample accommodation unit 11, a sample flow path 12, a detection region 13, and a filter unit 14. In addition, a tube pump unit 16, a target particle accommodation unit 17, a disposal unit 18, a sheath liquid accommodation unit 19, a gate liquid accommodation unit 20, and the like can be provided as necessary. Hereinafter, the particle sorting kit 1 is described in detail.

(1) Sample Accommodation Unit 11

The sample accommodation unit 11 accommodates a sample liquid containing particles to be sorted. The sample accommodation unit 11 can include, for example, a cylindrical cylinder body with one end opened and a lid fitted to the cylinder body to close the opening. Then, a plurality of opening valves for accommodating the sample liquid in the cylinder body is formed on the lid, and each opening valve employs a configuration of a check valve. Accordingly, in a state in which the sample liquid is accommodated in the sample accommodation unit 11 via the opening valves, the sample liquid does not go out of the sample accommodation unit 11. Furthermore, the sample liquid is sealed against an external atmosphere by the configuration of the opening valves.

The sample liquid is not particularly limited as long as this is a sample containing target particles sorted using the particle sorting kit 1 according to the present technology. Specifically, for example, there may be a liquid containing patient-derived cells and the like such as whole blood and a cell suspension containing only peripheral blood mononuclear cells and lymphocytes contained in whole blood.

The sample accommodation unit 11 may also include a substance that suppresses aggregation of particles in the sample liquid. By using the substance that suppresses aggregation of particles in the sample liquid, it is possible to suppress the aggregation of the particles in the sample liquid and remove an aggregate that still occurs by the filter unit 14 to be described later, so that impurities in the sample liquid may be more reliably removed.

Examples of the substance that suppresses aggregation of particles include deoxyribonuclease (DNase), ethylenediaminetetraacetic acid (EDTA), poloxamer (for example, "Pluronic F68" manufactured by BASF SE and the like) and the like.

In a case where the substance that suppresses aggregation of particles is included, a commonly used solution can be used as the solution used as the sample liquid as long as an effect of the present technology is not impaired, but in the present technology, phosphate buffered saline (PBS) is preferably used.

In a case where PBS is used, PBS not containing calcium ions and magnesium ions is preferable, but in a case where a substance that suppresses the aggregation of the particles described above is used, it is also possible to use PBS containing calcium ions and magnesium ions depending on a type of the substance to be used.

Specifically, in the present technology, it is preferable to use a combination of PBS (without $Ca^{2+}$, $Mg^{2+}$), PBS (with $Ca^{2+}$, $Mg^{2+}$)+DNase, PBS (without $Ca^{2+}$, $Mg^{2+}$)+EDTA, or the like, and it is also possible to add a poloxamer to the combination. Furthermore, albumin such as bovine serum albumin and human serum albumin can be added at a concentration of, for example, about 0.5%.

Note that, in the particle sorting kit 1 according to the present technology, it is also possible to provide a pre-sample accommodation unit 111 upstream of the sample accommodation unit 11, and provide the substance that suppresses aggregation of particles in the sample liquid, other chemicals and the like in the pre-sample accommodation unit 111.

(2) Sample Flow Path 12

Figure 2:
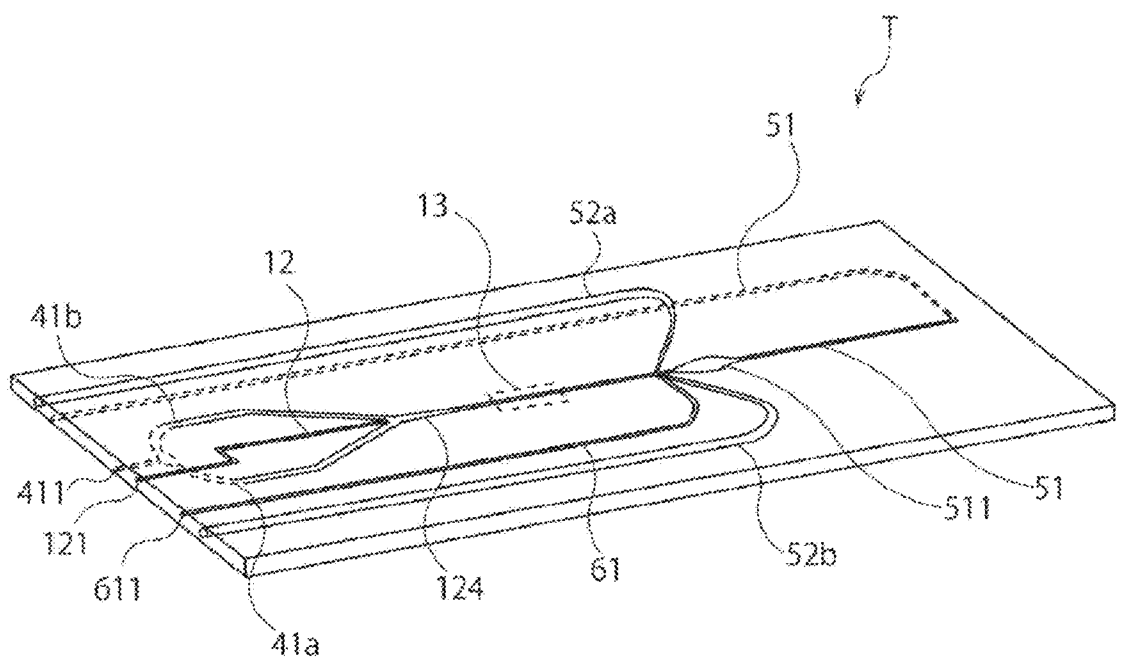
FIG. 2 is an enlarged conceptual diagram schematically illustrating an example of an embodiment of a microchip T that can be used in the particle sorting kit 1 according to the present technology.

FIG. 2 is an enlarged conceptual diagram schematically illustrating an example of an embodiment of a microchip T including a sample flow path 12 that can be used in the particle sorting kit 1 according to the present technology. The sample flow path 12 that can be used in the present technology can be provided in the microchip T as illustrated in FIG. 2, for example, but is not limited thereto, and flow paths used in a conventional flow cytometer, which is not illustrated, can also be used.

The sample liquid containing the particles is introduced from a sample inlet 121 into the sample flow path 12. Furthermore, a sheath liquid introduced from a sheath inlet 411 is divided into two sheath flow paths 41*a* and 41*b* and fed. The sample flow path 12 and the sheath flow paths 41*a* and 41*b* merge to form a main flow path 124. A sample liquid laminar flow fed through the sample flow path 12 and sheath liquid laminar flows fed through the sheath liquid paths 41*a* and 41*b* may merge in the main flow path 124 to form a sheath flow in which the sample liquid laminar flow is sandwiched between the sheath liquid laminar flows.

(3) Detection Region 13

Reference numeral 13 in FIG. 2 indicates a detection region in which excitation light is irradiated by a light irradiation unit 21 described later and fluorescence and scattered light are detected by a light detection unit 22 described later. The particles are fed to the detection region 13 in a state of being arranged in a line in the sheath flow formed in the main flow path 124, and are irradiated with the excitation light from the light irradiation unit 21.

The main flow path 124 branches into three flow paths downstream of the detection region 13. The main flow path 124 communicates with three branch flow paths of a sorting flow path 51 and disposal flow paths 52*a* and 52*b* downstream of the detection region 13. Among them, the sorting flow path 51 is a flow path to which particles determined to satisfy a predetermined optical characteristic (also referred to as "target particles") are taken in. In contrast, particles determined not to satisfy the predetermined optical characteristic (also referred to as "non-target particles") are not taken into the sorting flow path 51 and flow to any one of the two disposal flow paths 52*a* and 52*b*.

The target particles are taken into the sorting flow path 51 by generating a negative pressure in the sorting flow path 51 by a piezoelectric element such as a piezo element and sucking the sample liquid containing the target particles and the sheath liquid into the sorting flow path 51 using the negative pressure. The piezoelectric element is arranged so as to be in contact with a surface of the microchip T and is arranged at a position corresponding to the sorting flow path 51. More specifically, the piezoelectric element is arranged at a position corresponding to a pressure chamber 511 provided as an area in which an inner space is expanded in the sorting flow path 51.

As illustrated in FIG. 2, the inner space of the pressure chamber 511 is expanded in a planar direction (width direction of the sorting flow path 51) and also expanded in a cross-sectional direction (height direction of the sorting flow path 51). That is, the sorting flow path 51 is expanded in the width direction and the height direction in the pressure chamber 511. In other words, the sorting flow path 51 is formed so that a cross section perpendicular to a flow direction of the sample liquid and the sheath liquid becomes large in the pressure chamber 511.

The piezoelectric element generates an expansion/contraction force along with a change in applied voltage, and causes a pressure change in the sorting flow path 51 via the surface (contact surface) of the microchip T. When a flow occurs in the sorting flow path 51 along with the pressure change in the sorting flow path 51, a volume in the sorting flow path 51 changes at the same time. The volume in the sorting flow path 51 changes until reaching a volume defined by a displacement amount of the piezoelectric element corresponding to the applied voltage. More specifically, the piezoelectric element presses a displacement plate forming the pressure chamber 511 to keep the volume of the pressure chamber 511 small in a state of being expanded with the applied voltage. Then, when the applied voltage decreases, the piezoelectric element generates a force in a contracting direction, and weakens a pressing force on the displacement plate to generate the negative pressure in the pressure chamber 511.

In the present technology, in order to efficiently transmit the expansion/contraction force of the piezoelectric element into the pressure chamber 511, it is preferable that the surface of the microchip T is concaved at a position corresponding to the pressure chamber 511, and the piezoelectric element is arranged in the concave. Therefore, the displacement plate serving as the contact surface of the piezoelectric element may be thinned, so that the displacement plate may be easily displaced by a change in pressing force accompanying expansion/contraction of the piezoelectric element to cause a volume change of the pressure chamber 511.

The microchip T can be formed by bonding substrate layers on which the sample flow path 12, the sorting flow path 51 and the like are formed. The sample flow path 12, the sorting flow path 51 and the like may be formed on the substrate layers by injection molding of a thermoplastic resin using a mold. For thermoplastic resin, conventionally known plastics such as polycarbonate, polymethyl methacrylate resin (PMMA), cyclic polyolefin, polyethylene, polystyrene, polypropylene, or polydimethylsiloxane (PDMS) can be used as a material for the microchip. Note that the number of substrate layers constituting the microchip T is not particularly limited, and the microchip T may include, for example, two or more layers.

The microchip T used in the present technology may further include a gate liquid inlet 611 into which a gate liquid is introduced and a gate flow path 61 in which the gate liquid introduced from the gate liquid inlet 611 flows. The gate flow path 61 is provided, for example, so as to be connected to one or more of the sorting flow path 51 from the three branching flow paths of the sorting flow path 51 and the disposal flow paths 52*a* and 52*b* to the front of the pressure chamber 511, or is provided, for example, so as to perpendicularly intersect therewith. The "gate liquid" is the liquid allowed to flow to the gate flow path 61 and this serves as a main solvent of the sample such as microparticles recovered after sorting, so that various liquids may be selected according to the application. For example, in a case where a liquid medium to be used for a particle-containing liquid, the sheath liquid, and the particles are protein, a liquid according to the particles, such as a buffer liquid in which pH and the like is adjusted containing a surfactant may be allowed to flow at a constant flow rate.

In particular, in a case where the particles are cells, a cell culture solution, a cell preservative solution and the like may be used as the gate liquid. In a case where the cell culture solution is used, this is suitable in a case of performing a next step performed on the cells recovered after sorting, for example, steps such as cell culture, cell activation, and gene introduction. In a case where the cell preservative solution is used, this is suitable in a case of storing and transporting the recovered cells. Furthermore, in a case where the sorted and recovered cells are undifferentiated cells such as iPS cells, a differentiation inducing solution may be used, and a next operation may be efficiently performed.

Note that, various liquids may be similarly selected as the sheath liquid. In this specification, a flow formed by the gate liquid is referred to as a "gate flow".

An upstream side of the gate flow path 61 may be independently introduced from the gate flow inlet 611 and allowed to flow at an appropriate flow rate. In the present technology, since a flow rate of the liquid introduced into the gate flow path 61 is smaller than a flow rate of the liquid introduced into the sheath flow paths 41*a* and 41*b*, it is economical in a case of using an expensive liquid such as the cell culture solution, the cell preservative solution, or the differentiation inducing solution only for the gate flow path 61.

Furthermore, the gate flow may be generated so as to be branched from the sheath liquid flow. For example, the sheath flow paths 41*a* and 41*b* after the sheath liquid inlet may be connected to an upstream end of the gate flow path 61 so that the sheath liquid flow may be branched to flow also into the gate flow path 61 to form the gate flow. At that time, it is necessary to appropriately design a flow path resistance of the gate flow path 61 so that the gate flow rate becomes the appropriate flow rate.

At a site where the gate flow path 61 and the sorting flow path 51 intersect with each other, together with a gate flow directed straight in the gate flow path 61, gate flows directed toward the detection region 13 side and the pressure chamber 511 side are also generated. The latter gate flow may prevent particles (non-target particles) that should not be acquired from entering the pressure chamber 511 side of the sorting flow path 51. The gate flow that flows through the gate flow path 61 flows out to the sorting flow path 51 and branches into the gate flows directed toward the detection region 13 side and the pressure chamber 511 side of the sorting flow path 51. The former gate flow can prevent the non-target particles from entering the pressure chamber 511 side of the sorting flow path 51.

The microchip T that can be used in the present technology to which the sample accommodation unit 11, the filter unit 14 to be described later and the like are connected is sometimes distributed as a part of an article such as a cartridge, a unit, a device, a kit, and an instrument for a closed cell sorter.

(4) Filter Unit 14

Figure 3:
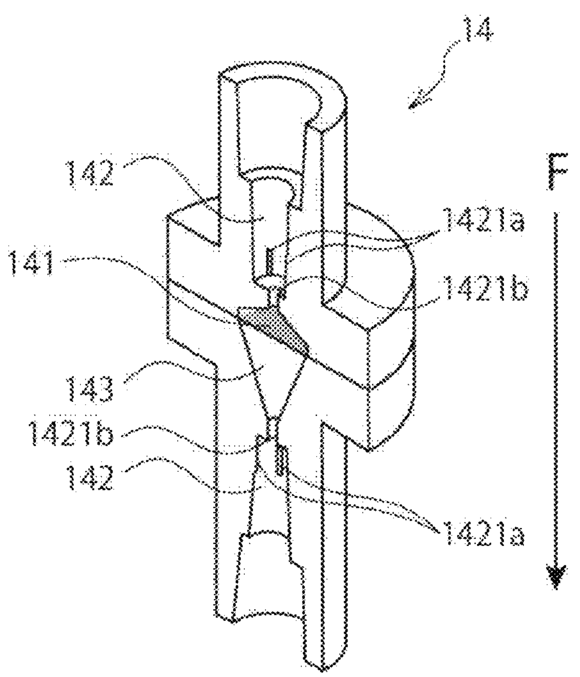
FIG. 3 is an enlarged perspective cross-sectional view schematically illustrating an example of an embodiment of a filter unit 14 used in the particle sorting kit 1 according to the present technology.

FIG. 3 is an enlarged perspective cross-sectional view schematically illustrating an example of an embodiment of the filter unit 14 used in the particle sorting kit 1 according to the present technology. The filter unit 14 includes at least a filter 141 and a fitting portion 142. Furthermore, the tapered portion 143 may be provided as necessary.

(4-1) Filter 141

A material, an inner diameter, a pore diameter and the like of the filter 141 that may be used for the filter unit 14 of the particle sorting kit 1 according to the present technology may be designed according to a size and a form of the target particles to be sorted.

As a material of the filter 141 used in the present technology, nylon, polyethylene terephthalate (PET), polyethylene (PE) and the like may be used. Among them, in the present technology, it is preferable to manufacture the filter using nylon from the viewpoint of the pore diameter, sterilization, and adhesiveness.

Furthermore, the inner diameter of the filter 141 used in the present technology is preferably 0.5 to 10 mm, and more preferably set to 2 to 7 mm. The smaller the area of the filter 141, the smaller the loss amount of the target particle can be suppressed.

Moreover, the pore diameter of the filter 141 used in the present technology may be designed according to a type of the target particles. For example, in a case where the target particles are blood cells, this is preferably set to 20 to 100 μm. Furthermore, in a case where the target particles are iPS cells and the like, this may be set to be equal to or more than 100 μm. As described above, by designing the pore diameter of the filter 141 according to the type of the target particles, it is possible to efficiently remove impurities while preventing damage or death.

Figure 4:
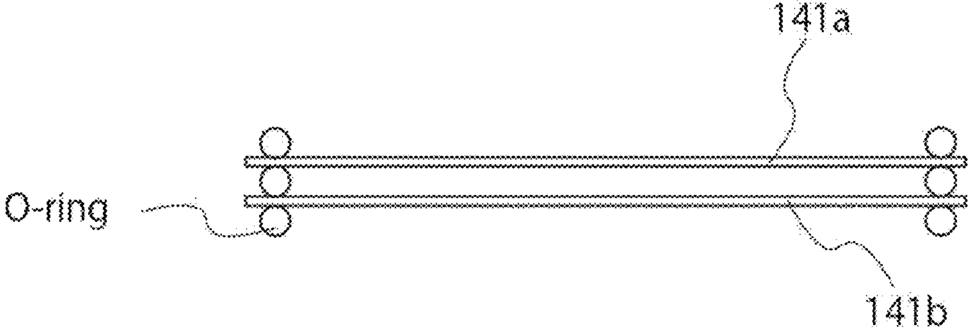
FIG. 4 is an enlarged cross-sectional view schematically illustrating an example of a stacking method of filters 141 used in the present technology.

Note that, a plurality of filters 141 may be stacked to be used. By stacking two or more filters 141 to use, it is possible to more reliably prevent an outflow of aggregates of particles and foreign matters. In a case where a plurality of filters 141 is stacked, the filters may be stacked directly, but as illustrated in FIG. 4, filters 141*a* and 141*b* may be stacked via O-rings.

(4-2) Fitting Portion 142

The filter unit 14 of the particle sorting kit 1 according to the present technology include the fitting portion 142 for fitting to an outer diameter of a tube 15 for connection to the sample accommodation unit 11 and/or the sample flow path 12. Since the tube 15 used in the present technology has a very small inner diameter, tube connection using a barb shape as with a general tube cannot be performed. Accordingly, by providing the fitting portion 142 that presses the tube 15 from the outer diameter and fits to the outer diameter on the filter unit 14 used in the present technology, this may also be connected to the tube 15 having a small inner diameter.

Figure 5:
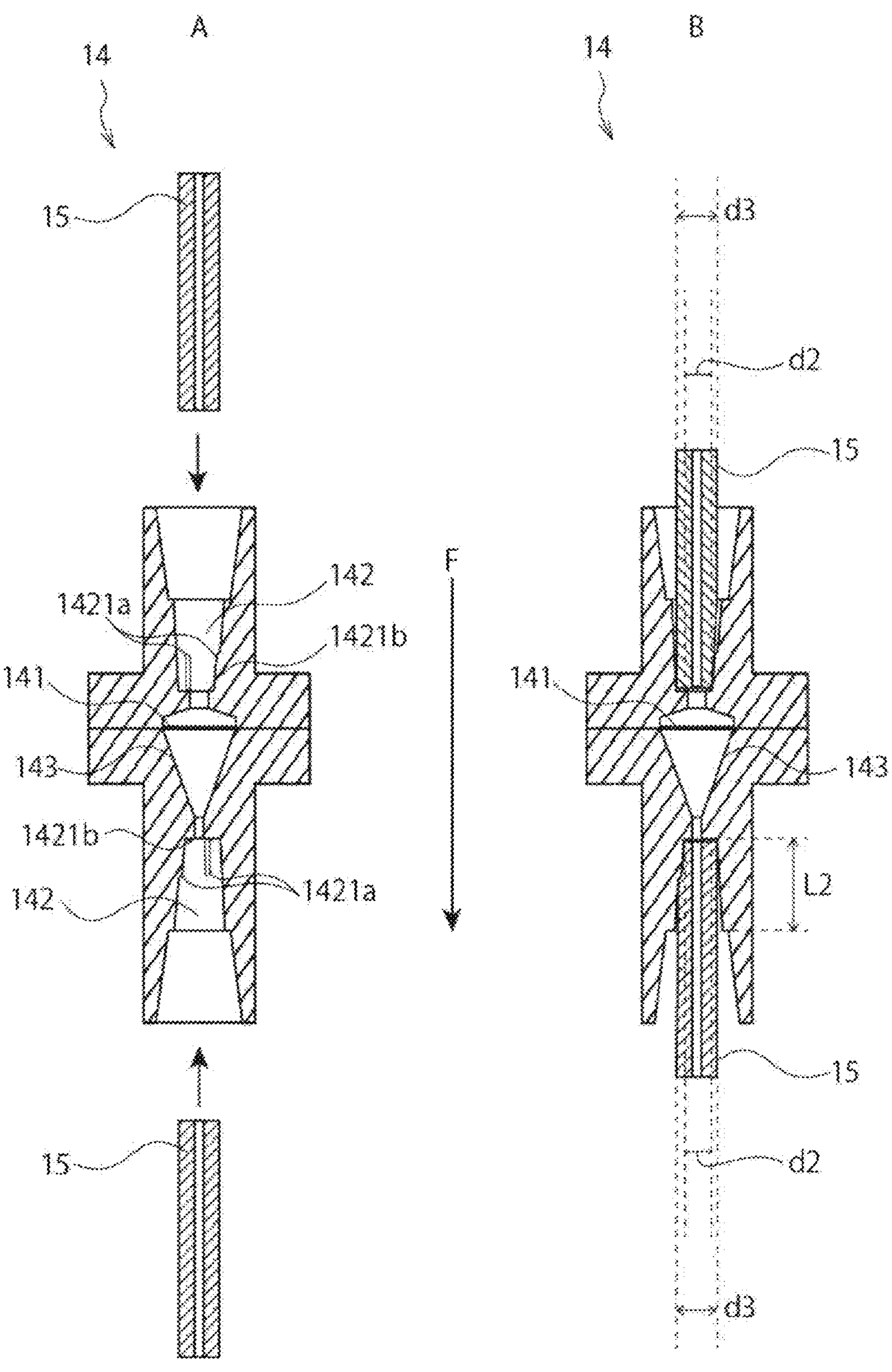
FIG. 5 is a conceptual view schematically illustrating a method of connecting the filter unit 14 to a tube 15.

FIG. 5 is a conceptual view illustrating a method of connecting the filter unit 14 and the tube 15. FIG. 5A is a conceptual view illustrating a state of the filter unit 14 and the tube 15 before connection, and FIG. 5B is a conceptual view illustrating a state in which the filter unit 14 is connected to the tube 15. As illustrated in FIG. 5B, the filter unit 14 may be connected to the tube 15 by pushing the tube 15 into the fitting portion 142 of the filter unit 14.

Figure 18:
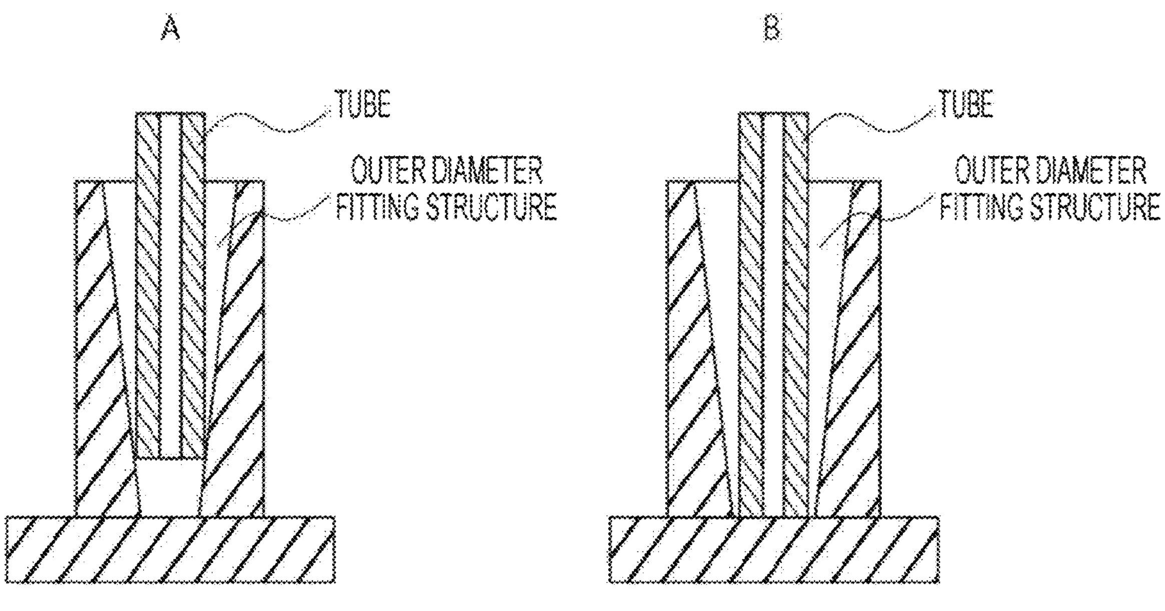
FIG. 18 is a conceptual diagram illustrating a general outer diameter fitting structure.
Figure 19:
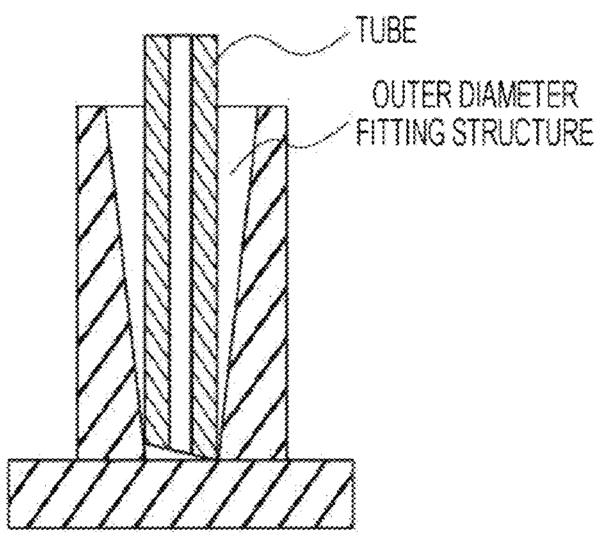
FIG. 19 is a conceptual diagram illustrating the general outer diameter fitting structure.

FIGS. 18 and 19 are conceptual diagrams illustrating a general outer diameter fitting structure. In mass production of the tube and the outer diameter fitting structure, both have dimensional tolerance, and thus, in a case where the inner dimension of the outer diameter fitting structure is made small or the tube is made large, there arises a problem that the tube does not reach deep (see FIG. 18A). Conversely, in a case where the inner dimension of the outer diameter fitting structure is made large or the tube is made small, there arises a problem that the tube is loose and is not held (see FIG. 18B). Then, due to these reasons, a dead volume has also occurred.

In addition, the tube end surface is cut with a cutter, scissors, or a specialized tool, but cutting in a completely flat state requires high accuracy, and it is considered unrealistic to perform cutting at the time of mass production. As illustrated in FIG. 19, when the tube is obliquely cut, there is a problem that, when the tube is inserted into a port of the filter, one side actually floats even if the tube seems to be inserted deep. Then, a dead volume also occurs due to the generated space portion.

On the other hand, in the present technology, the fitting portion 142 of the filter unit 14 includes a protrusion 1421 protruding in the direction of the tube 15, so that connectivity between the tube 15 and the filter unit 14 can be improved, and the dead volume can be reduced. Hereinafter, a specific structure of the protrusion 1421 will be described in detail.

First Embodiment of Filter Unit 14

Figure 6:
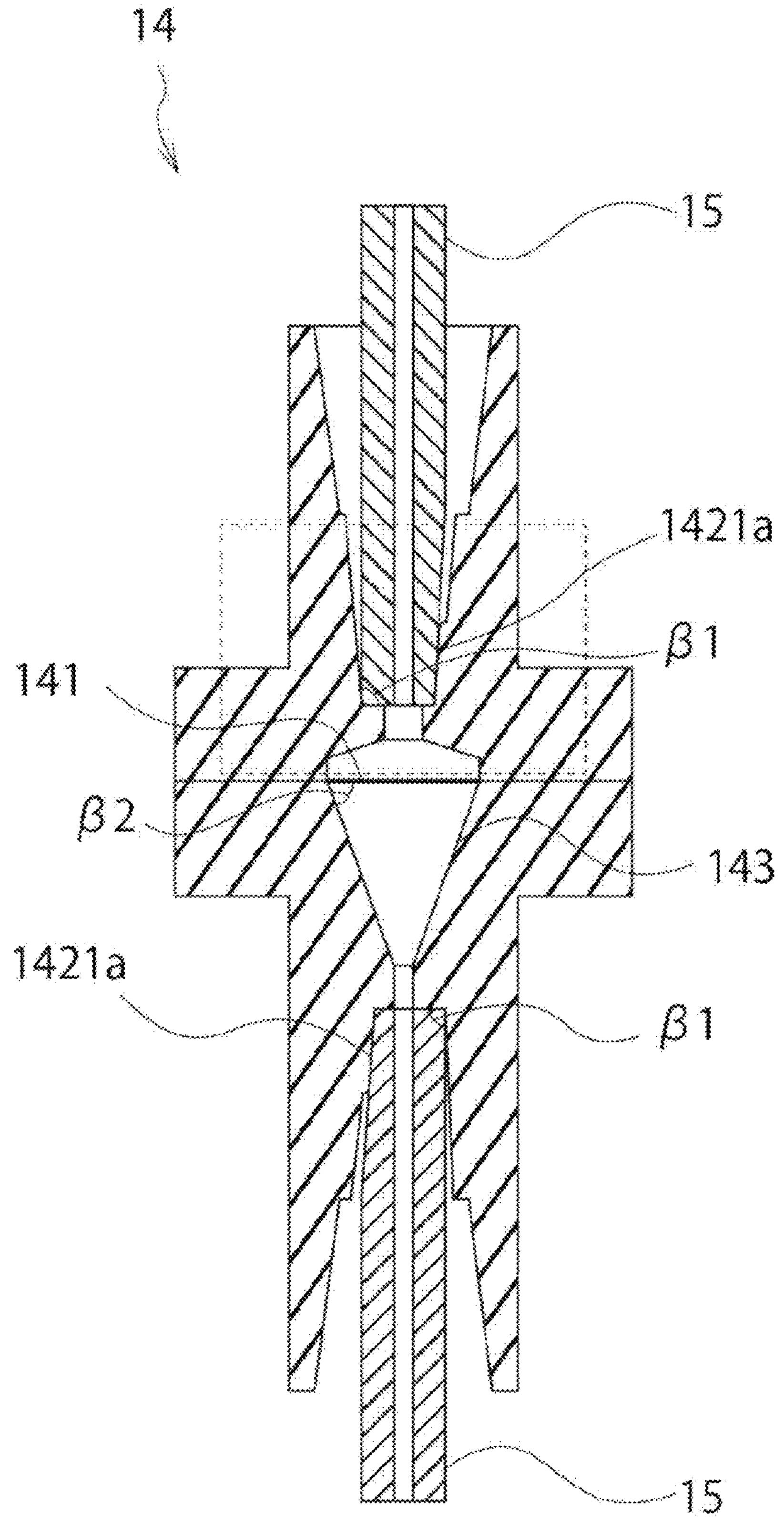
FIG. 6 is an enlarged cross-sectional view schematically illustrating the first embodiment of the filter unit 14 used in the particle sorting kit 1 according to the present technology.
Figure 7:
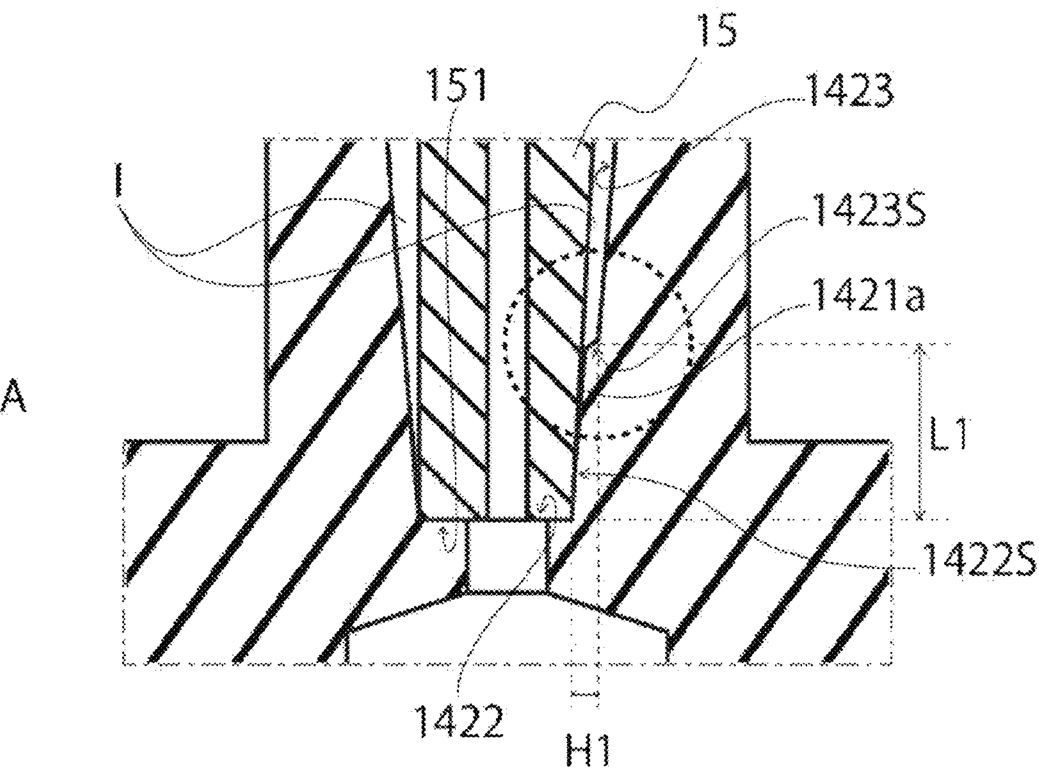
FIG. 7A is an enlarged cross-sectional view in which a portion (broken line portion in FIG. 6) of the fitting portion 142 in FIG. 6 of the filter unit 14 according to the first embodiment is further enlarged.
FIG. 7B is an enlarged cross-sectional view in which a broken line circle portion in FIG. 7A is further enlarged.
Figure 7:
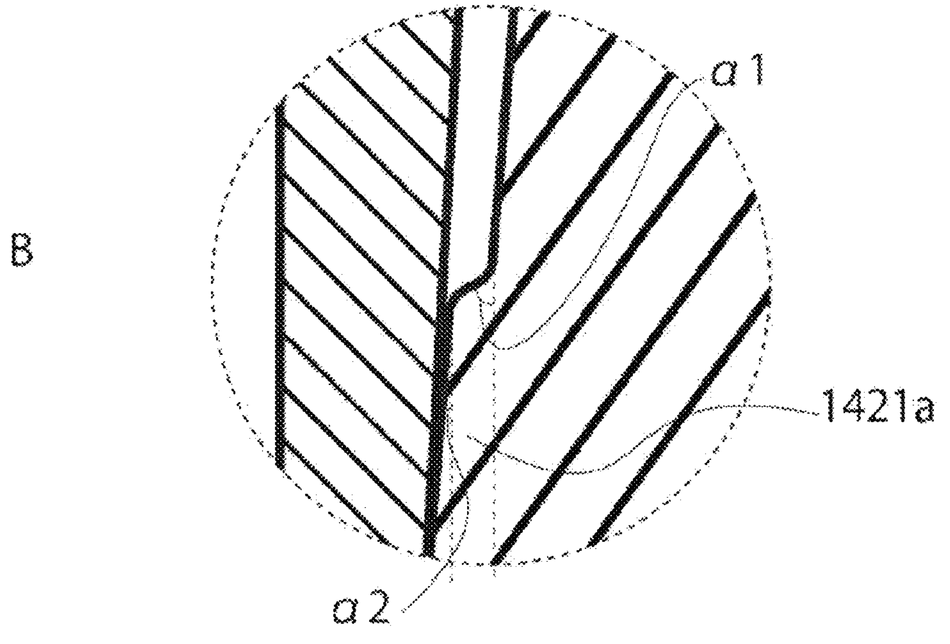

FIG. 6 is an enlarged cross-sectional view schematically illustrating the first embodiment of the filter unit 14 used in the particle sorting kit 1 according to the present technology. FIG. 7A is an enlarged cross-sectional view in which a portion (broken line portion in FIG. 6) of the fitting portion 142 in FIG. 6 of the filter unit 14 according to the first embodiment is further enlarged. FIG. 7B is an enlarged cross-sectional view in which a broken line circle portion in FIG. 7A is further enlarged. The fitting portion 142 of the filter unit 14 according to the first embodiment includes a side surface side protrusion 1421*a* protruding in a side surface direction of the tube 15 as a protrusion.

As described above, in the general outer diameter fitting structure, since the side surface of the tube is received by the entire inner side surface to be fitted, in a case where the inner dimension of the outer diameter fitting structure is made small or the tube is made large, there is a problem that the tube is not pushed deep (FIG. 18A). However, in the present technology, when the tube 15 is inserted into the fitting portion 142, first, the side surface side protrusion 1421*a* comes into contact with the tube 15, and in a case where the outer diameter of the tube is larger than the internal dimension of the portion of the side surface side protrusion 1421*a*, the tube 15 can be inserted to the depth of the fitting portion 142 in a state where the tube 15 is crushed at the portion of the side surface side protrusion 1421*a*.

In addition, since the tube 15 is easily crushed by the side surface side protrusion 1421*a*, the outer diameter of the tube 15 can be set to be larger than the inner diameter of the side surface side protrusion 1421*a* portion of the fitting portion 142. Thus, when the tube 15 is inserted, it is possible to prevent the tube from becoming loose as illustrated in FIG. 18B, and it is possible to improve the holding property of the tube 15, improve workability, and perform positioning such as centering of the tube 5.

The form of the side surface side protrusion 1421*a* can be freely designed as long as the effect of the present technology is not impaired. In the present technology, it is preferable that the side surface side protrusion 1421*a* is continuous in a longitudinal direction of the tube 15 (flow direction F of the sample liquid). In the present technology, since the tube 15 is supported by the side surface side protrusion 1421*a*, it is possible to prevent the tube 15 from wobbling and contribute to improvement of the holding property of the tube and improvement of workability by forming the tube 15 to be continuous in the longitudinal direction of the tube 15.

A lower limit value of a length L1 of the side surface side protrusion 1421*a* in the longitudinal direction can also be freely designed as long as the effect of the present technology is not impaired, but in the present technology, the lower limit value is preferably equal to or more than 0.5 mm, and more preferably equal to or more than 1.0 mm. When the thickness is equal to or more than 0.5 mm, the holding property and workability of the tube 15 can be further improved. In addition, in a case of a third embodiment described later (see FIG. 12), the lower limit value of the length L1 of the side surface side protrusion 1421*a* in the longitudinal direction is preferably equal to or more than a height H2 (see FIG. 10) of a connection surface side protrusion 1421*b*, and more preferably equal to or more than the height H2+0.5 mm of the connection surface side protrusion 1421*b*.

In addition, the side surface side protrusion 1421*a* is preferably located farther in a direction of a connection end portion 151 with the filter unit 14 of the tube 15 than an adhesive position where the tube 15 and the fitting portion 142 are adhered to each other. This is because, in general, in a state where the tube 15 is inserted into the fitting portion 142, an adhesive is often poured into and fixed to the gap I between the tube 15 and the fitting portion 142 indicated by reference sign I in FIG. 7. Therefore, it is preferable that the side surface side protrusion 1421*a* is continuous from a connection surface 1422 of the fitting portion 142 with the tube 15 to below the adhesive position.

An upper limit value of the length L1 of the side surface side protrusion 1421*a* in the longitudinal direction can also be freely designed as long as the effect of the present technology is not impaired, but in the present technology, the upper limit value is preferably equal to or less than the height of a filter port to be used, and more preferably equal to or less than −1 mm of the height of the filter port to be used. By setting to be equal to or less than the height of the filter port to be used, a sufficient amount of adhesive necessary for adhesion can be poured into the gap I between the tube 15 and the fitting portion 142, and leakage of the adhesive can be prevented.

A height H1 of the side surface side protrusion 1421*a* from the fitting portion 142 inner side surface 1423 can also be freely designed as long as the effect of the present technology is not impaired. In the first embodiment, it is preferable to design the height H1 so that the tip of the tube 15 can reach the connection surface 1422 of the fitting portion 142 with the tube 15. In addition, in the third embodiment (see FIG. 12) to be described later, it is preferable to design the height H1 so that the tip of the tube 15 can reach the connection surface side protrusion 1421*b*. By designing in this manner, it is possible to improve the holding property of the tube 15, assembly workability, and positioning performance of the tube 15.

The side surface side protrusion 1421*a* continuous in the longitudinal direction of the tube 15 preferably further has a gradient to narrow the inner diameter of the fitting portion 142 toward the filter 141. This configuration facilitates insertion of the tube 15, improves assembly workability, and facilitates removal of the metal mold during manufacturing.

In this case, the gradient preferably includes a first gradient 1423S connected to the inner side surface 1423 of the fitting portion 142 and a second gradient 1422S connected to the first gradient 1423S and connected to the connection surface 1422 of the fitting portion 142 with the tube 15. With such a two-step gradient, insertion of the tube 15 is further facilitated, assembly workability is further improved, and removal of the mold at the time of manufacturing is further facilitated.

The connecting portion between the first gradient 1423S and the second gradient 1422S is preferably rounded. When it is rounded, insertion of the tube 15 is further facilitated, and assembly workability is further improved.

An angle $\alpha$1 of the first gradient 1423S with respect to the inner side surface 1423 of the fitting portion 142 can be freely designed as long as the effect of the present technology is not impaired, but in the present technology, it is preferably equal to or more than an angle $\alpha$2 and equal to or less than 60° with respect to the inner side surface 1423 of the fitting portion 142 to be described later, and more preferably equal to or more than the angle $\alpha$2 and equal to or less than 45°.

The angle $\alpha$2 of the second gradient 1422S with respect to the inner side surface 1423 of the fitting portion 142 can be freely designed as long as the effect of the present technology is not impaired, but in the present technology, 0.1 to 10° is preferable, and 0.1 to 5° is more preferable.

Figure 8:
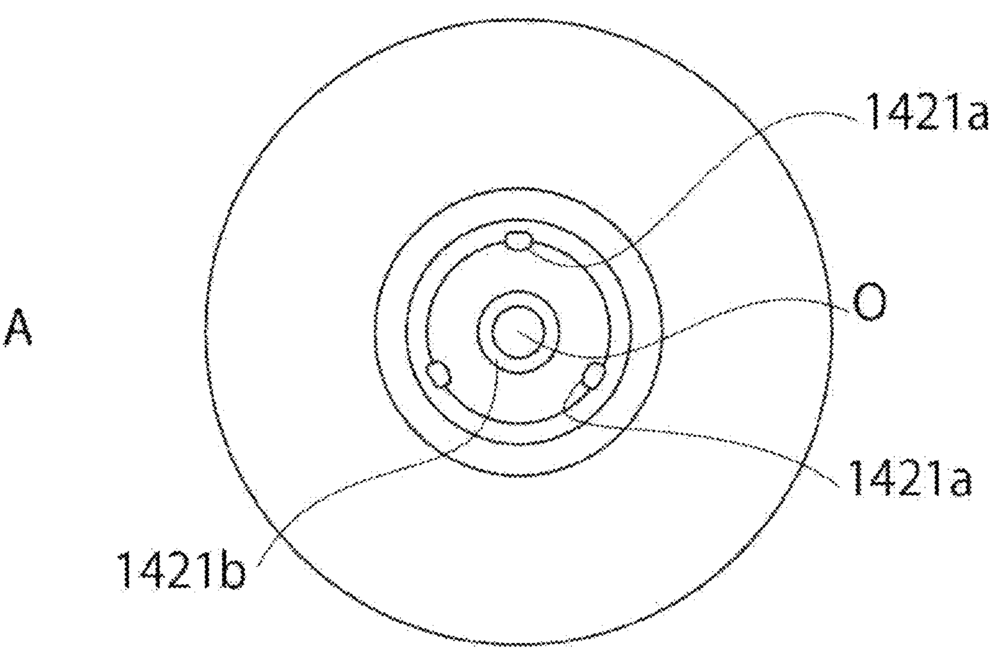
FIG. 8 is an enlarged schematic view illustrating two examples in which the fitting portion 142 portion of the filter unit 14 is viewed from an insertion direction of the tube 15.
Figure 8:
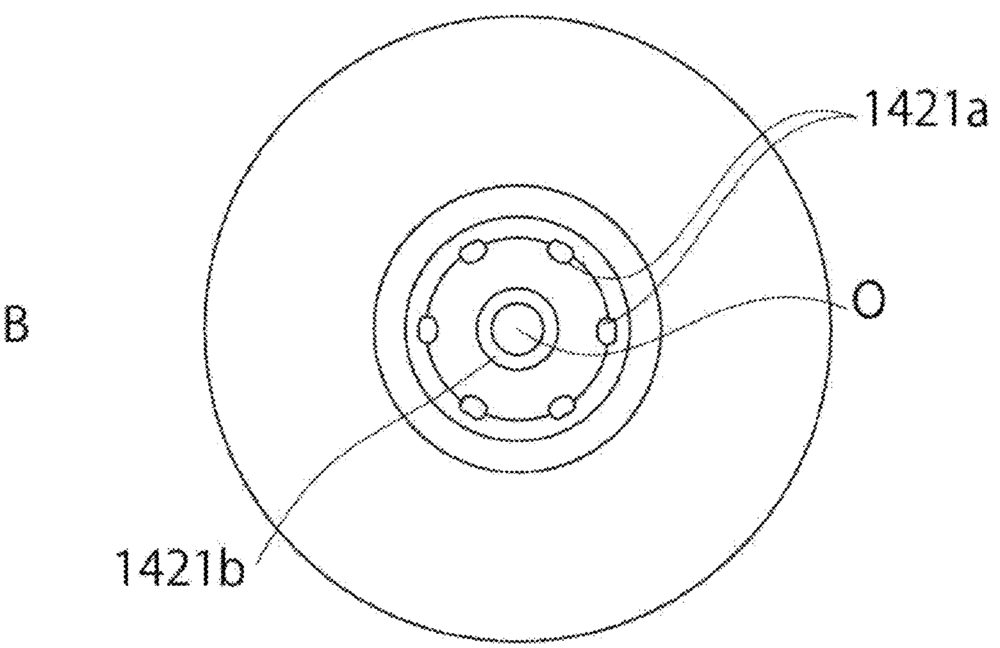

The number of the side surface side protrusions 1421*a* described above is not particularly limited as long as the effect of the present technology is not impaired, but a plurality of the side surface side protrusions is preferably provided in one fitting portion 142. FIG. 8 is an enlarged schematic view illustrating two examples in which the fitting portion 142 portion of the filter unit 14 is viewed from an insertion direction of the tube 15. The example illustrated in FIG. 8A is an example in which three side surface side protrusions 1421*a* are provided in one fitting portion 142, and the example illustrated in FIG. 8B is an example in which six side surface side protrusions 1421*a* are provided in one fitting portion 142.

By providing a plurality of the side surface side protrusions 1421*a* in one fitting portion 142, it is possible to improve the holding property and workability of the tube 15 and the positioning performance of the tube 5. Note that the upper limit of the number of the side surface side protrusions 1421*a* is not particularly limited, but if the number is too large, a possibility that the tube 15 may not be pushed deep arises, complexity in manufacturing, cost improvement, or a decrease in positioning accuracy of centering of the tube or the like may occur, and thus the number of the side surface side protrusions 1421*a* in one fitting portion 142 is preferably equal to or less than 6, and more preferably equal to or less than 3.

Second Embodiment of Filter Unit 14

Figure 9:
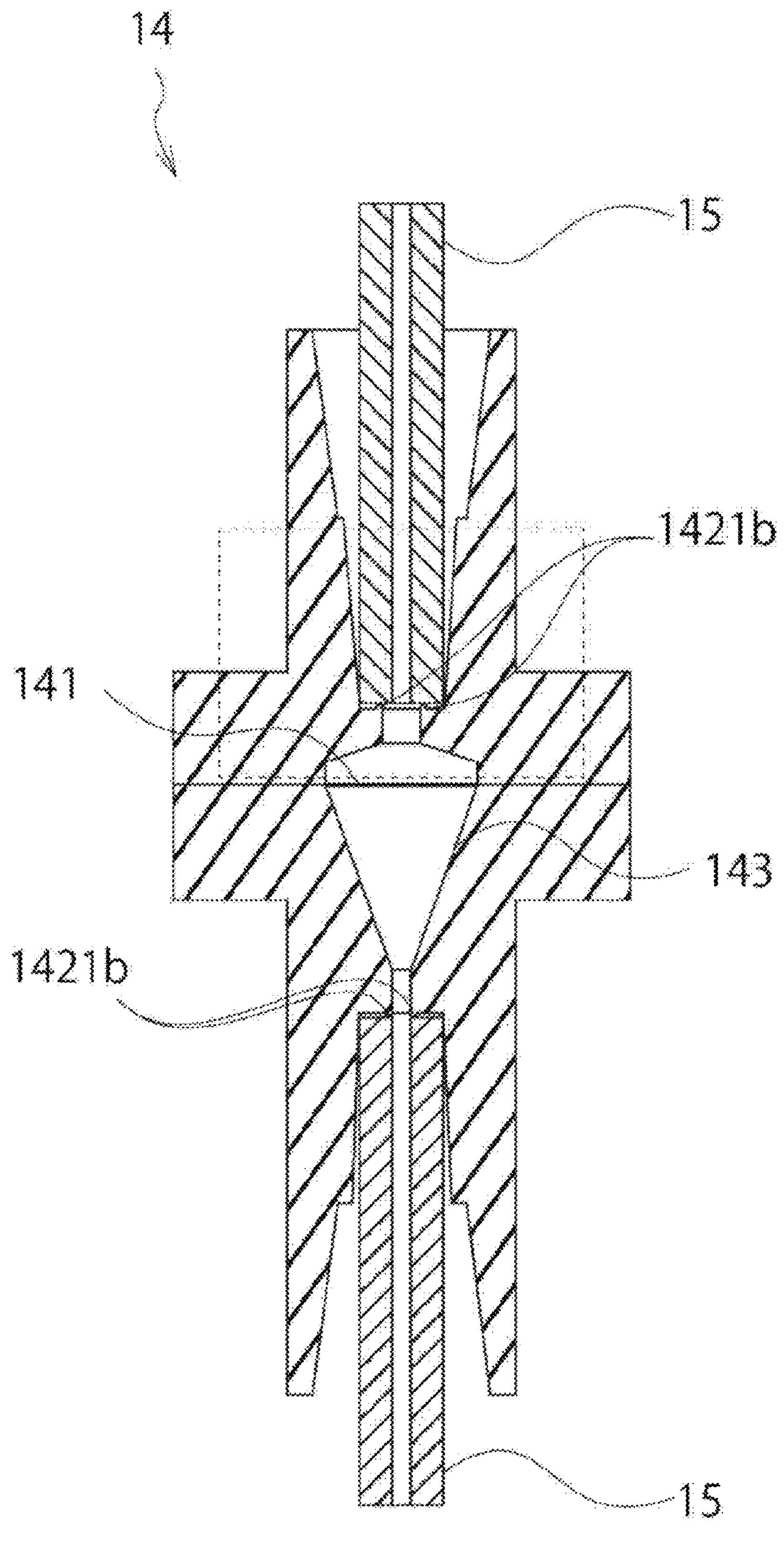
FIG. 9 is an enlarged cross-sectional view schematically illustrating a second embodiment of the filter unit 14 used in the particle sorting kit 1 according to the present technology.
Figure 10:
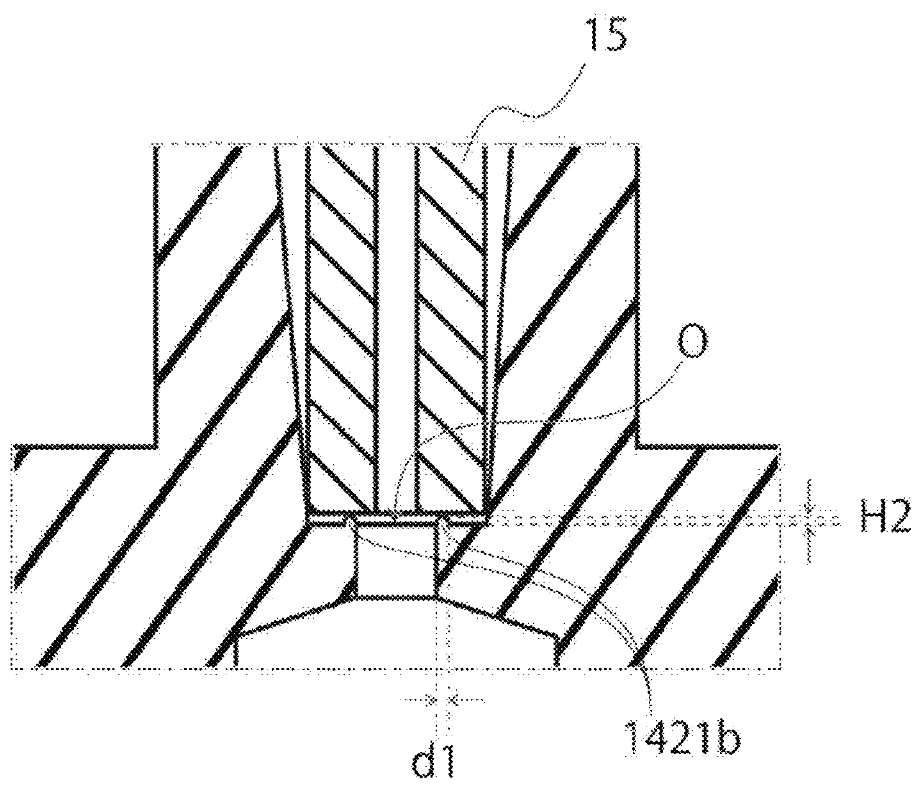
FIG. 10 is an enlarged cross-sectional view in which a portion (broken line portion in FIG. 9) of the fitting portion 142 in FIG. 9 of the filter unit 14 according to the second embodiment is further enlarged.

FIG. 9 is an enlarged cross-sectional view schematically illustrating a second embodiment of the filter unit 14 used in the particle sorting kit 1 according to the present technology. FIG. 10 is an enlarged cross-sectional view in which a portion (broken line portion in FIG. 9) of the fitting portion 142 in FIG. 9 of the filter unit 14 according to the second embodiment is further enlarged. The fitting portion 142 of the filter unit 14 according to the second embodiment includes a connection surface side protrusion 1421*b* protruding in a direction of the connection end portion of the tube 15 with the filter unit 14 as a protrusion.

As described above, in the general outer diameter fitting structure, since the connection surface of the tube is received by the entire connection surface (bottom surface) of the fitting structure, there is a problem that a part of the connection end portion of the tube floats when the tube is cut obliquely (see FIG. 19). However, in the present technology, when the tube 15 is inserted into the fitting portion 142, the tube 15 can be inserted to the depth of the fitting portion 142 in a state where the connection end portion 151 of the tube 15 is crushed by the connection surface side protrusion 1421*b*. Thus, it is possible to prevent a part of the connection end portion of the tube from floating as illustrated in FIG. 19, to reduce an unnecessary space other than the flow path through which the sample liquid flows, and consequently, it is possible to reduce the dead volume.

The connection surface 1422 of the fitting portion 142 with the tube 15 is provided with an opening O leading to the filter 141. The inner diameter of the opening O is preferably larger than the inner diameter of the flow path of the tube 15. By making the inner diameter of the opening O larger than the inner diameter of the flow path of the tube 15, it is possible to prevent leakage of the sample flow and blocking of the flow path hole.

Furthermore, the connection surface side protrusion 1421*b* is preferably provided on the entire circumference of the opening O. That is, the outer periphery of the opening O is preferably formed by the connection surface side protrusion 1421*b* (see FIG. 8). By providing the connection surface side protrusion 1421*b* on the entire circumference of the opening O, it is possible to more reliably prevent leakage of the sample flow.

Moreover, it is preferable that a contact portion of the connection surface side protrusion 1421*b* with the tube 15 is rounded. Thus, even in a case where the obliquely cut tube 15 is used, the connection surface 151 of the tube 15 and the connection surface side protrusion 1421*b* come into contact with each other not by a surface but by a line, so that the tube 15 is more easily crushed, and the tube 15 can be inserted to the depth of the fitting portion 142. Consequently, the dead volume can be more reliably reduced, and the flow path of the tube 15 to the opening O are sealed, so that the leakage of the sample flow can be more reliably prevented.

The height H2 of the connection surface side protrusion 1421*b* from the connection surface 1422 can also be freely designed as long as the effect of the present technology is not impaired, but in the present technology, the height H2 is preferably 0.2 to 5 mm, and more preferably 0.4 to 2 mm. By setting the height H2 of the connection surface side protrusion 1421*b* from the connection surface 1422 to 0.2 to 5 mm, it is possible to improve the holding property of the tube 15, the assembly workability, and the positioning performance of the tube 15. Furthermore, by setting the height H2 to be equal to or more than 0.2 mm, leakage of the sample liquid can be prevented, and by setting the height H2 to be equal to or less than 5 mm, inflow of the adhesive to the connection surface 1422 side can be prevented.

A width d1 of the connection surface side protrusion 1421*b* can also be freely designed as long as the effect of the present technology is not impaired, but in the present technology, the width d1 is preferably 0.2 to 5 mm, and more preferably 0.4 to 2 mm. By setting the width d1 of the connection surface side protrusion 1421*b* to 0.2 to 5 mm, it is possible to improve the holding property of the tube 15, the assembly workability, and the positioning performance of the tube 15. Furthermore, by setting the width d1 to be equal to or more than 0.2 mm, leakage of the sample liquid can be prevented.

Third Embodiment of Filter Unit 14

Figure 11:
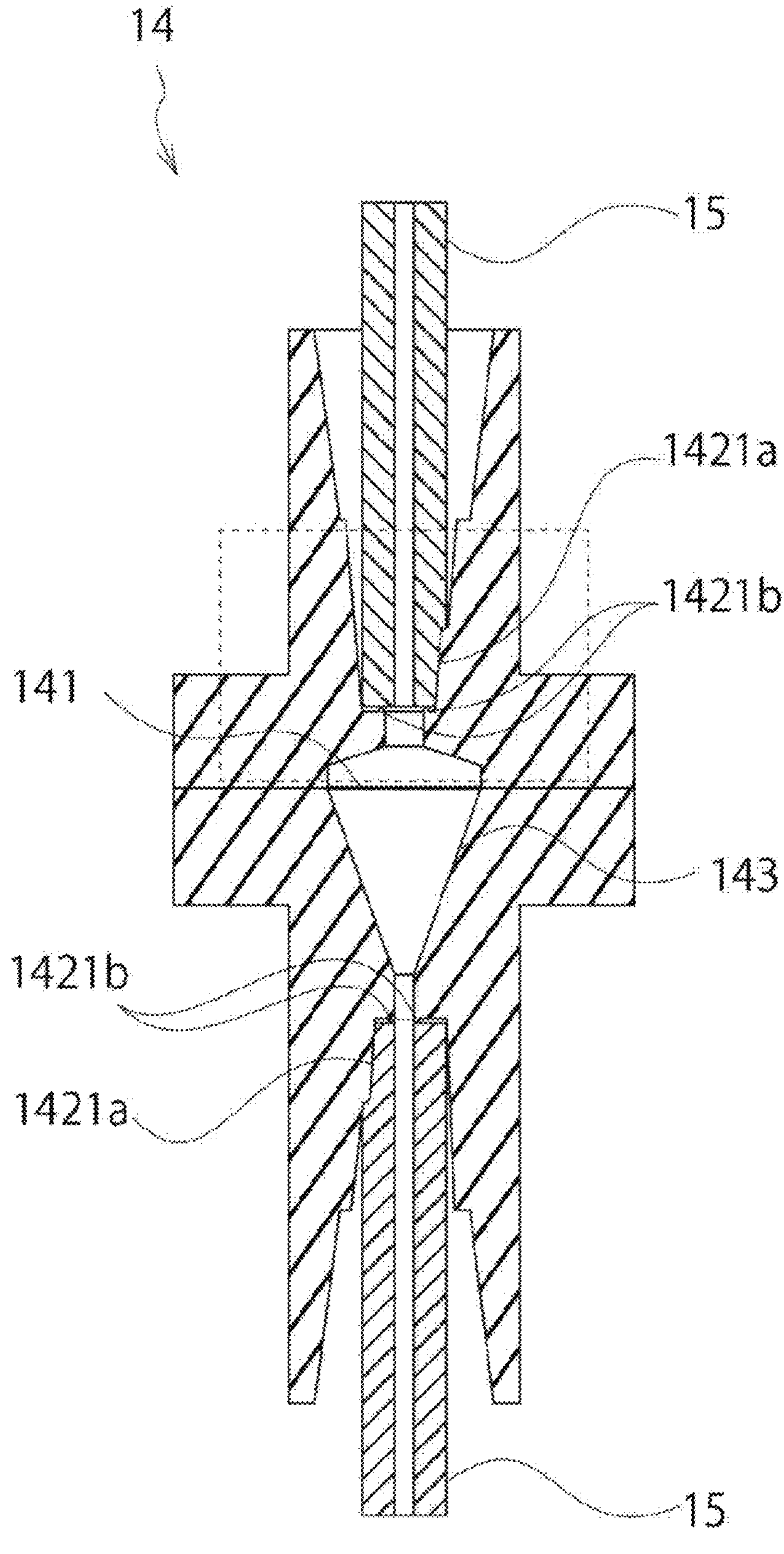
FIG. 11 is an enlarged cross-sectional view schematically illustrating the third embodiment of the filter unit 14 used in the particle sorting kit 1 according to the present technology.

FIG. 11 is an enlarged cross-sectional view schematically illustrating the third embodiment of the filter unit 14 used in the particle sorting kit 1 according to the present technology.

Figure 12:
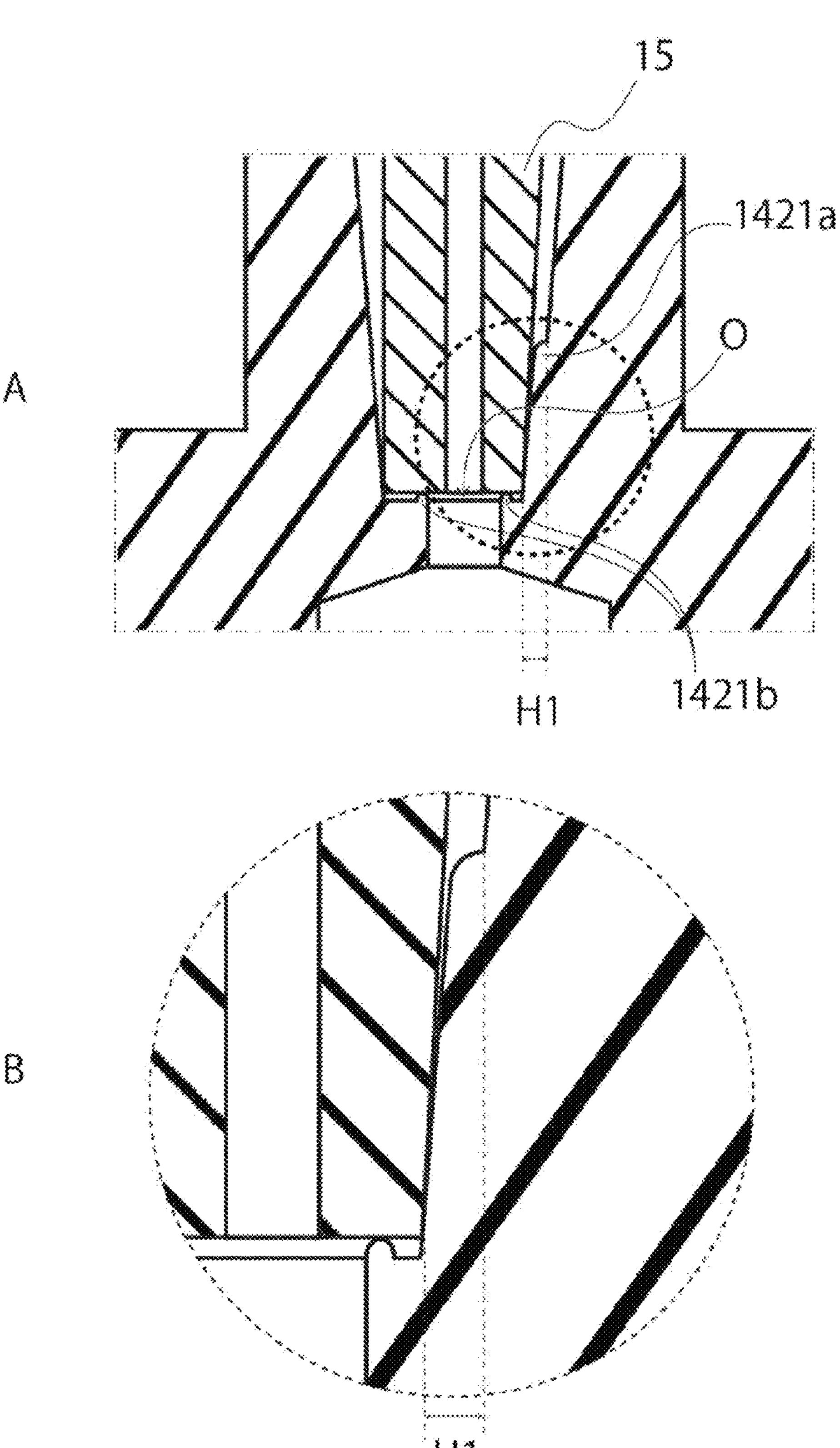
FIG. 12A is an enlarged cross-sectional view in which a portion (broken line portion in FIG. 11) of the fitting portion 142 in FIG. 11 of the filter unit 14 according to the third embodiment is further enlarged.
FIG. 12B is an enlarged cross-sectional view in which a broken line circle portion of FIG. 12A is further enlarged.

FIG. 12 is an enlarged cross-sectional view in which a portion (broken line portion in FIG. 11) of the fitting portion 142 in FIG. 11 of the filter unit 14 according to the third embodiment is further enlarged. The fitting portion 142 of the filter unit 14 according to the third embodiment includes, as protrusions, a side surface side protrusion 1421*a* protruding in the side surface direction of the tube 15 and a connection surface side protrusion 1421*b* protruding in a connection end portion direction with the filter unit 14 of the tube 15. That is, the third embodiment is an example in which both the side surface side protrusion 1421*a* of the first embodiment and the connection surface side protrusion 1421*b* of the second embodiment are provided as the protrusion 1421. The details of the side surface side protrusion 1421*a* and the connection surface side protrusion 1421*b* are similar to those of the first embodiment and the second embodiment described above, and thus the description thereof is omitted here.

Although the fitting portion 142 described above exists on both the upstream side and the downstream side of the filter 141, the form of the upstream fitting portion 142 and the form of the downstream fitting portion 142 may be the same or different. For example, the form of the fitting portion 142 upstream of the filter 141 may be the first embodiment, and the form of the fitting portion 142 downstream of the filter 141 may be the third embodiment. In addition, for example, even in a case where the form of the fitting portion 142 on the upstream side of the filter 141 and the form of the fitting portion 142 on the downstream side are the same embodiment, minute dimensions may be designed to be different depending on the form of the tube 15 to be used and the form of the flow path of the tube 15.

The fitting portion 142 preferably has a tapered structure in which the diameter decreases toward the filter 141. The taper angle β1 of the tapered structure illustrated in FIG. 6 can be designed according to the form of the tube 15 to be connected, but in the present technology, the taper angle β1 of the tapered structure is preferably set to 80 to 90°. By designing the taper angle β1 of the tapered structure within this range, even in a case where variation in outer diameter dimension of the tube 15 and variation in dimension of the fitting portion 142 slightly occur at the time of manufacturing, it is possible to reliably connect them to each other.

Furthermore, an inner diameter d2 on the filter 141 side and a length L2 in a longitudinal axis direction of the fitting portion 142 illustrated in FIG. 5 can be designed according to the form of the tube 15 to be used. For example, in a case where the tube 15 having an outer diameter d3 of 3.4 to 3.5 mm is used, the inner diameter d2 on the filter 141 side of the fitting portion 142 is preferably designed to be 3.3 to 3.6 mm, and the length L2 in the longitudinal axis direction of the fitting portion 142 is preferably designed to be 15 to 25 mm. By designing the inner diameter d2 on the filter 141 side of the fitting portion 142 and the length L2 in the longitudinal axis direction of the fitting portion 142 according to the form of the tube 15 to be used, it is possible to reliably connect even in a case where the variation in dimension of the fitting portion 142 slightly occurs at the time of manufacturing.

(4-3) Tapered Portion 143

The filter unit 14 of the particle sorting kit 1 according to the present technology may include the tapered portion 143 downstream of the filter 141. The tapered portion 143 can be configured to narrow the flow path diameter along the flow direction F of the sample liquid.

Figure 20:
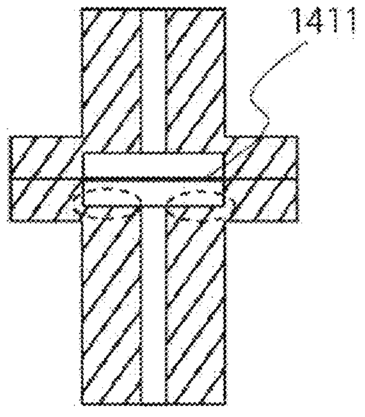
FIG. 20 is a cross-sectional view of a filter structure generally used in the related art.

FIG. 20 is a cross-sectional view of a filter structure generally used in the related art. In the conventional filter structure, particles in a sample liquid that have passed through a filter 1411 settle in a portion indicated by a broken line in FIG. 20, and a loss amount of the particles has been a problem.

On the other hand, by providing the tapered portion 143 downstream of the filter 141, it is possible to prevent the particles in the sample liquid that have passed through the filter 141 from settling on an inner wall surface of the filter unit 14 and to reduce the loss amount of the particles.

In the particle sorting kit 1 according to the present technology, the taper angle β2 of the tapered portion 143 illustrated in FIG. 6 is preferably 50 to 80°. By setting the taper angle β2 of the tapered portion 143 to be equal to or more than 50°, it is possible to more advantageously prevent the particles in the sample liquid that have passed through the filter 141 from settling on the inner wall surface of the filter unit 14. Furthermore, by setting the taper angle β2 of the tapered portion 143 to 80° or less, the filter unit 14 can be downsized.

The filter unit 14 described above may be arranged at any position as long as the effect of the present technology is not impaired; however, for example, as in the first embodiment of the particle sorting kit 1 according to the present technology illustrated in FIG. 1, by providing the same upstream of the sample accommodation unit 11, it is possible to prevent entry of foreign matters into the sample accommodation unit 11 at an initial stage.

Figure 13:
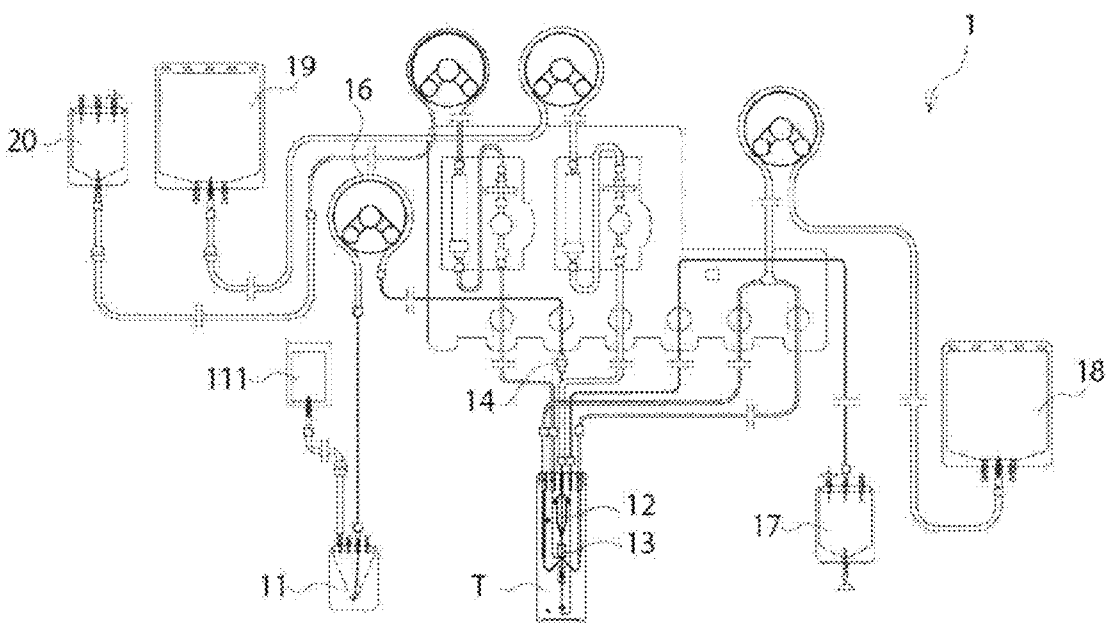
FIG. 13 is a conceptual diagram schematically illustrating the second embodiment of the particle sorting kit 1 according to the present technology.

Furthermore, for example, as in the second embodiment of the particle sorting kit 1 according to the present technology illustrated in FIG. 13, the filter unit 14 may be arranged between the sample accommodation unit 11 and the microchip T (detection region 13). In this case, preferably, the filter unit 14 is disposed immediately before the microchip T. By arranging the filter unit 14 immediately before the microchip T (detection region 13), it is possible to reliably prevent entry of foreign matter into the microchip T (detection region 13), and consequently, it is possible to improve accuracy of analysis performed in the microchip T and sorting of target particles.

Figure 14:
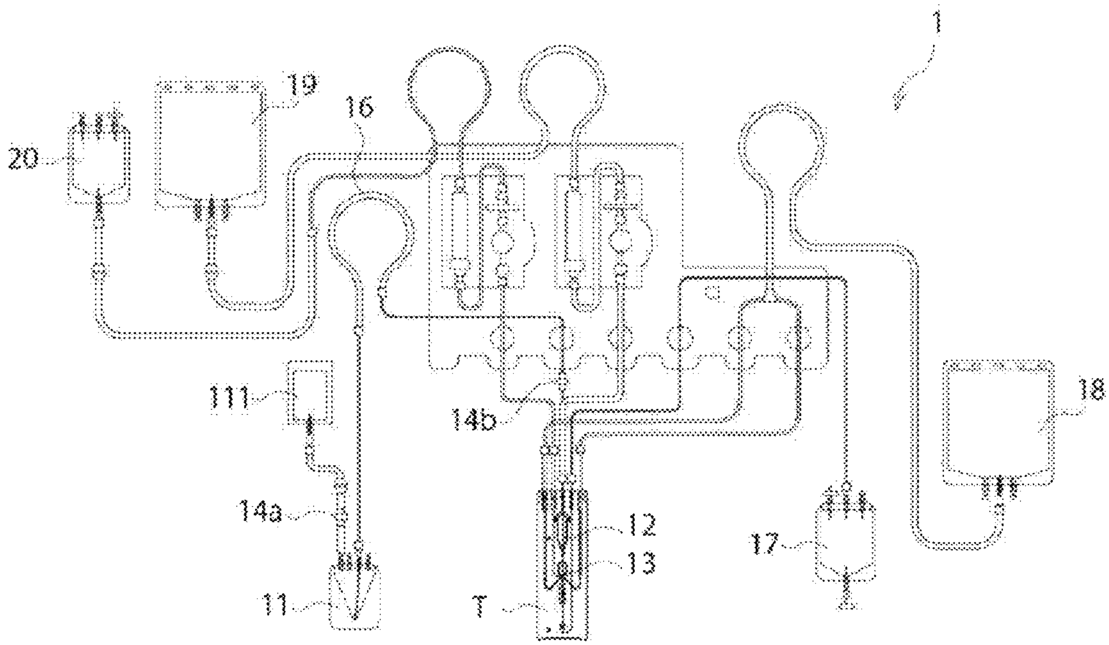
FIG. 14 is a conceptual diagram schematically illustrating the third embodiment of the particle sorting kit 1 according to the present technology.

Moreover, for example, as in the third embodiment of the particle sorting kit 1 according to the present technology illustrated in FIG. 14, filter units 14*a* and 14*b* may be arranged at two positions: upstream of the sample accommodation unit 11 and between the sample accommodation unit 11 and the microchip T (detection region 13). By arranging in this manner, the filter unit 14*b* arranged between the sample accommodation unit 11 and the microchip T (detection region 13) can remove the aggregate formed while the particles in the sample liquid flow from the sample accommodation unit 11 to the microchip T (detection region 13) while the filter unit 14*a* arranged upstream of the sample accommodation unit 11 prevents the entry of the foreign matters into the sample accommodation unit 11 at the initial stage. Consequently, it is possible to improve accuracy of analysis and sorting of the target particles performed in the microchip T.

(5) Tube Pump Unit 16

The particle sorting kit 1 according to the present technology can include a tube pump unit 16. In the particle sorting kit 1 according to the present technology, the tube pump unit 16 may be formed by using an elastic material. Note that a roller for squeezing an elastic tube may be provided on the particle sorting kit 1 according to the present technology, but it is also possible to allow the sample liquid in the tube 15 to flow by installing the tube pump unit 16 of the particle sorting kit 1 according to the present technology in a roller portion provided on a particle sorting device 2 side to be described later.

In the particle sorting kit 1 according to the present technology, the tube pump unit 16 can be arranged at any position as long as the effect of the present invention is not impaired; however, as in the second embodiment of the particle sorting kit 1 according to the present technology illustrated in FIG. 13 and the third embodiment of the particle sorting kit 1 according to the present technology illustrated in FIG. 14, it is preferable to arrange the same between the filter unit 14 (14*b*) provided between the sample accommodation unit 11 and the microchip T and the sample accommodation unit 11. In the tube pump unit 16, the particles in the sample liquid are likely to aggregate, so that by arranging in this manner, even in a case where the aggregate of the particles is formed while flowing through the tube pump unit 16, the formed aggregate may be removed by the filter unit 14 (14*b*) before the microchip T. Consequently, it is possible to improve accuracy of analysis and sorting of the target particles performed in the microchip T.

(6) Target Particle Accommodation Unit 17

The particle sorting kit 1 according to the present technology may be provided with the target particle accommodation unit 17 as necessary. The target particle accommodation unit 17 accommodates the sorted target particles. The target particle accommodation unit 17 is formed into, for example, a bag shape in which the target particles are accommodated, and is provided with an opening valve connected to the sorting flow path 51 of the microchip T. The opening valve employs a configuration of what is called a check valve, and in a state in which the target particles are accommodated in the target particle accommodation unit 17 via the opening valve, the target particles do not go out of the target particle accommodation unit 17. Furthermore, the configuration of the opening valve prevents the target particles from coming into contact with the external atmosphere.

The configuration of the target particle accommodation unit 17 described above is merely an example, and a known configuration may be employed as long as the target particles do not come into contact with the external atmosphere.

(7) Disposal Unit 18

In the particle sorting kit 1 according to the present technology, when only the target particles are sorted from the sample liquid in the microchip T, it is necessary to exclude the non-target particles. In addition, since a sheath flow is formed in the microchip T to sort target particles, it is necessary to eliminate a sample liquid containing non-target particles. Thus, the particle sorting kit 1 according to the present technology may be provided with the disposal unit 18 as necessary. The particles other than the target particles are disposed in the disposal unit 18.

(8) Sheath Liquid Accommodation Unit 19

In the particle sorting kit 1 according to the present technology, the sheath flow is formed, and the target particles are sorted from the sample liquid in the sample flow path 12. Thus, the particle sorting kit 1 according to the present technology may be provided with the sheath liquid accommodation unit 19 as necessary. The sheath liquid accommodation unit 19 accommodates a sheath liquid.

The sheath liquid accommodation unit 19 is provided with, for example, a tubular member into which the sheath liquid flows, and the tubular member communicates with the sheath inlet 411 of the microchip T. Consequently, the sheath liquid flows into the flow path of the microchip T, and a sheath flow is formed.

The configuration of the sheath liquid accommodation unit 19 is not particularly limited, and a known configuration may be employed. Furthermore, the configuration for discharging the sheath liquid from the sheath liquid accommodation unit 19 is also not particularly limited, and for example, a drive source such as an actuator may be used.

(9) Gate Liquid Accommodation Unit 20

Furthermore, the particle sorting kit 1 according to the present technology may be provided with the gate liquid accommodation unit 20 as necessary. The gate liquid is accommodated in the gate liquid accommodation unit 20. Since the "gate liquid" is similar to that described above, this is not herein described.

The gate liquid accommodation unit 20 is provided with, for example, a tubular member into which the gate liquid flows, and the tubular member communicates with the gate liquid inlet 611 of the microchip T. Consequently, the gate liquid flows into the flow path of the microchip T, and the target particles are sorted.

The configuration of the gate liquid accommodation unit 20 is not particularly limited, and a known configuration may be employed. In addition, the configuration for discharging the gate liquid from the gate liquid accommodation unit 20 is also not particularly limited, and for example, a drive source such as an actuator may be used.

A part or all of respective parts of the particle sorting kit 1 according to the present technology described above may be hermetically connected. Thus, the sorting of the target particles and the storage of the target particles may be executed in a sealed space, so that a purification degree of the sorting of the target particles may be improved. Furthermore, it is possible to prevent contamination of the particle sorting kit itself by mist containing the target particles and/or mixture of other substances into the sorted target particles. Consequently, the particle sorting kit 1 according to the present technology may also be applied to clinical applications such as immune cell therapy requiring purity of target particles.

Furthermore, the particle sorting kit 1 itself according to the present technology may be made disposable, thereby avoiding a risk of contamination between samples and the like to improve usability.

Moreover, a plurality of units of the particle sorting kit 1 according to the present technology can be provided. For example, although not illustrated, by further providing the microchip T downstream of the target particle accommodation unit 17, the target particles sorted from the sample liquid can be sorted more finely.

2. Particle Sorting Device 2 and Particle Measurement System 3

Figure 15:
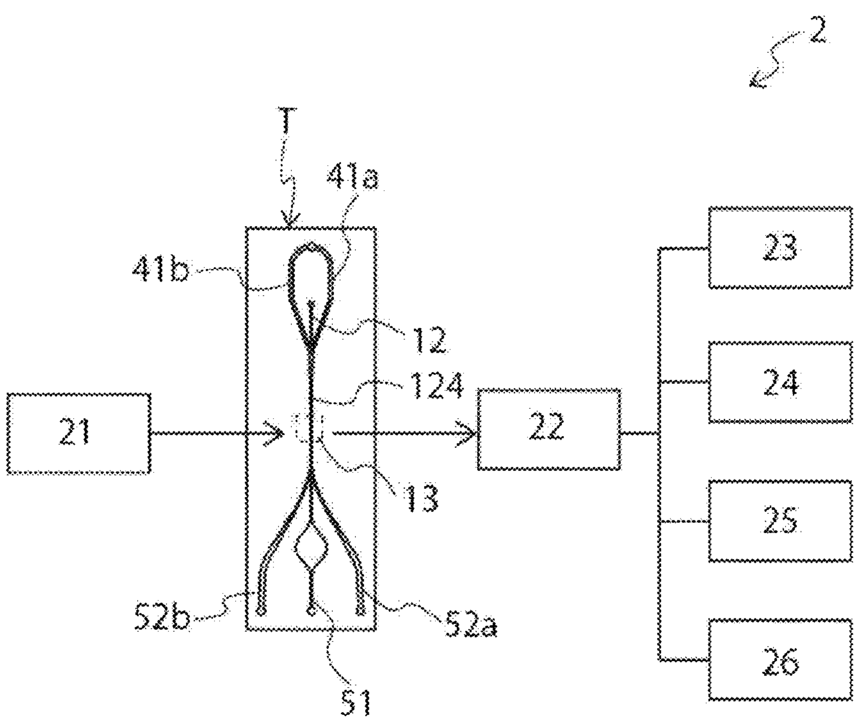
FIG. 15 is a conceptual diagram schematically illustrating an example of an embodiment of a particle sorting device 2 according to the present technology.
Figure 16:
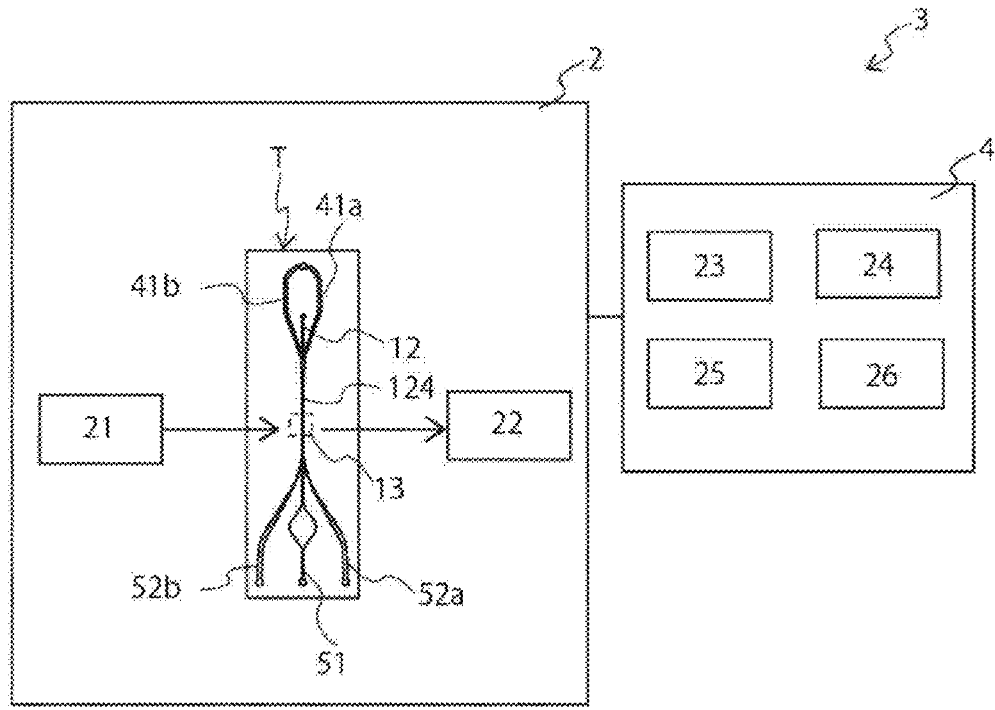
FIG. 16 is a conceptual diagram schematically illustrating an example of an embodiment of a particle sorting system 3 according to the present technology.
Figure 17:
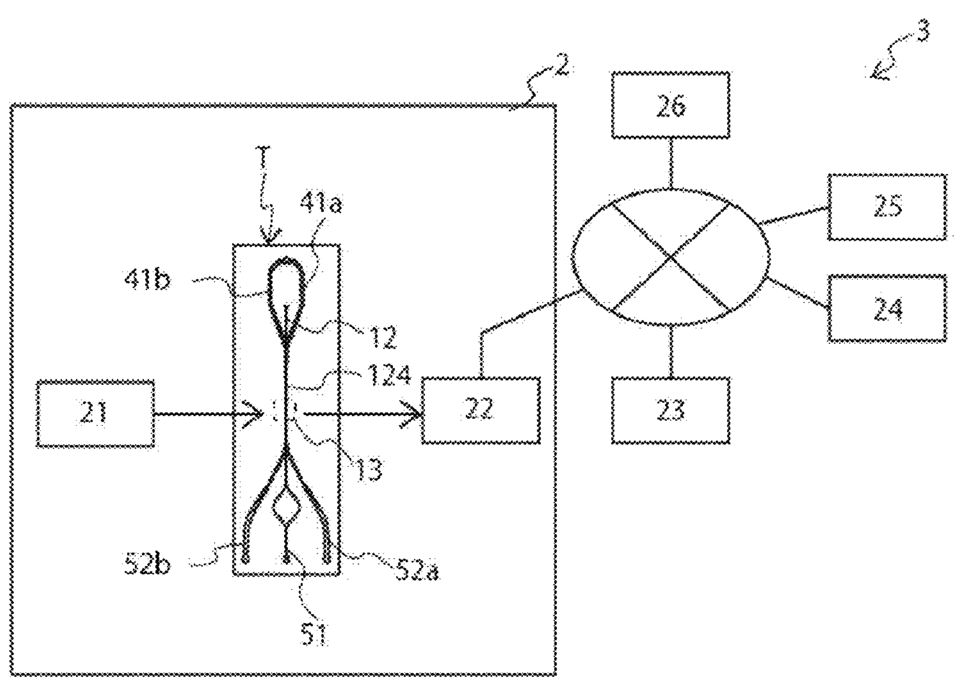
FIG. 17 is a conceptual diagram schematically illustrating an example different from FIG. 10 of an embodiment of the particle sorting system 3 according to the present technology.

FIG. 15 is a conceptual diagram schematically illustrating an example of an embodiment of a particle sorting device 2 according to the present technology. FIGS. 16 and 17 are conceptual diagrams schematically illustrating an example of an embodiment of a particle sorting system 3 according to the present technology. Note that, in FIGS. 15 to 17, for convenience of space, only the portion of the microchip T is illustrated in the particle sorting kit 1 according to the present technology.

The particle sorting device 2 and the particle sorting system 3 according to the present technology are at least provided with the particle sorting kit 1 according to the present technology described above, the light irradiation unit 21, and the light detection unit 22. Furthermore, an information processing unit 23, a storage unit 24, a display unit 25, a user interface 26 and the like may also be provided as necessary.

Note that, the information processing unit 23, the storage unit 24, the display unit 25, the user interface 26 and the like may be provided in the particle sorting device 2 as illustrated in FIG. 15, or the particle measurement system 3 including an information processing device 4 provided with the information processing unit 23, the storage unit 24, the display unit 25, and the user interface 26, and the particle sorting device 2 may be made as illustrated in FIG. 16. Furthermore, as illustrated in FIG. 17, the particle measurement system 3 obtained by connecting the information processing unit 23, the storage unit 24, the display unit 25, and the user interface 26 independent from one another to the light detection unit 22 of the particle sorting device 2 via a network may be made.

Moreover, the information processing unit 23, the storage unit 24, and the display unit 25 may be provided in a cloud environment and connected to the particle sorting device 2 via a network. In this case, a record of information processing in the information processing unit 23 and the like may be stored in the storage unit 24, and various types of information stored in the storage unit 24 may be shared by a plurality of users.

(1) Particle Sorting Kit 1

The particle sorting device 2 is provided with the particle sorting kit 1 that performs sorting, storage and the like of the target particles. Note that, since the particle sorting kit 1 is similar to that described above, this is not herein described.

(2) Light Irradiation Unit 21

The light irradiation unit 21 irradiates the sample to be sorted with light. Specifically, the light irradiation unit 21 irradiates the particles flowing through the detection region 13 with light (excitation light).

The light irradiation unit 21 includes, for example, a light source that emits the excitation light, an objective lens that condenses the excitation light on the sample liquid that flows through the main flow path 124 and the like. The light source may be appropriately selected from a laser diode, a SHG laser, a solid-state laser, a gas laser, a high-luminance LED and the like according to a purpose of analysis to be used. Furthermore, the light irradiation unit 21 may include optical elements other than the light source and the object lens as necessary.

(3) Light Detection Unit 22

The light detection unit 22 detects fluorescence and scattered light emitted from a sorting target sample irradiated with the excitation light. Specifically, the light detection unit 22 detects the fluorescence and scattered light emitted from the sample and converts the same into an electric signal. Then, the electric signal is output to the information processing unit 23 to be described later.

The configuration of the light detection unit 22 is not particularly limited, and a known configuration may be employed, and further, a method of converting into the electric signal is not particularly limited.

(4) Information Processing Unit 23

The electric signal converted by the light detection unit 22 is input to the information processing unit 23. Specifically, the information processing unit 23 determines the optical characteristics of the sample liquid and the target particles contained in the sample liquid on the basis of the input electric signal.

Moreover, the information processing unit 23 is provided with a gating circuit for calculating a threshold for sorting the target particles from the sample liquid, a threshold for determining whether or not the target particles of the requested number or more are sorted and the like. In a case where the threshold for sorting the target particles from the sample liquid is calculated by the configuration of the gating circuit, this is converted into an electric signal for sorting, and the sorting signal is output to the piezoelectric element provided on the microchip T.

Note that a configuration of the information processing unit 23 is not particularly limited, and a known configuration may be employed. Moreover, a known method may also be employed as an information processing method performed by the gating circuit of the information processing unit 23.

(5) Storage Unit 24

The particle sorting device 2 and the particle sorting system 3 according to the present technology may further be provided with the storage unit 24 in which various data are stored. The storage unit 24 may store, for example, all items regarding measurement such as optical information of the particles detected by the light detection unit 22, the record of the information processing in the information processing unit 23 and the like.

Furthermore, as described above, in the present technology, since the storage unit 24 may be provided in the cloud environment, it is also possible for each user to share the various types of information recorded in the storage unit 24 on the cloud via a network.

Note that, in the present technology, the storage unit 24 is not indispensable, and it is also possible to store the various data using an external storage device and the like.

(6) Display Unit 25

The particle sorting device 2 and the particle sorting system 3 according to the present technology may further be provided with the display unit 25 that displays various types of information. The display unit 25 may display all items regarding measurement such as, for example, optical information of the particles detected by the light detection unit 22, various data subjected to information processing by the information processing unit 23 and the like.

In the present technology, the display unit 25 is not indispensable, and an external display device may also be connected. As the display unit 25, for example, a display, a printer and the like may be used.

(7) User Interface 26

The particle sorting device 2 and the particle sorting system 3 according to the present technology may further be provided with the user interface 26 that is a part operated by the user. The user may access each unit through the user interface 26 to control each unit.

In the present technology, the user interface 26 is not indispensable, and an external operating device may also be connected. As the user interface 26, for example, a mouse, a keyboard and the like may be used.

Note that the present technology may also take the following configuration.

(1)

A particle sorting kit, including:

a sample accommodation unit that accommodates a sample liquid containing particles;

a sample flow path through which the sample liquid flows;

a detection region in which a target particle is detected from the sample liquid; and a filter unit including a filter and a fitting portion that fits to an outer diameter of a tube for connection with the sample accommodation unit and/or the sample flow path, in which the fitting portion includes a protrusion that protrudes in the tube direction.

(2)

The particle sorting kit according to (1), including, as the protrusion, a side surface side protrusion that protrudes in a side surface direction of the tube.

(3)

The particle sorting kit according to (1) or (2), further including, as the protrusion, a connection surface side protrusion that protrudes in a direction of a connection end portion of the tube with the filter unit.

(4)

The particle sorting kit according to (1), further including, as the protrusion:

a side surface side protrusion that protrudes in a side surface direction of the tube; and a connection surface side protrusion that protrudes in a direction of a connection end portion of the tube with the filter unit.

(5)

The particle sorting kit according to (2) or (4), in which the side surface side protrusion is continuous in a longitudinal direction of the tube, and is located farther in a direction of a connection end portion of the tube with the filter unit with respect to an adhesive position at which the tube and the fitting portion are adhered.

(6)

The particle sorting kit according to (2), (4), or (5), in which the side surface side protrusion is continuous in a longitudinal direction of the tube, and includes a gradient to narrow an inner diameter of the fitting portion toward a filter direction.

(7)

The particle sorting kit according to (6), in which the gradient includes:

a first gradient connected to an inner side surface of the fitting portion; and a second gradient connected to the first gradient and connected to a connection surface with the tube in the fitting portion.

(8)

The particle sorting kit according to (7), in which a connecting portion between the first gradient and the second gradient is rounded.

(9)

The particle sorting kit according to any one of (2), (4), and (5) to (8), in which a plurality of the side surface side protrusions is provided in one fitting portion.

(10)

The particle sorting kit according to any one of (3) to (9), in which an opening communicating with the filter is provided on a connection surface of the fitting portion with the tube, and the connection surface side protrusion is provided on the entire circumference of the opening.

(11)

The particle sorting kit according to any one of (3) to (9), a contact portion of the connection surface side protrusion with the tube is rounded.

REFERENCE SIGNS LIST

1 Particle sorting kit
11 Sample accommodation unit
12 Sample flow path
13 Detection region
14 Filter unit
15 Tube
16 Tube pump unit

17 Target particle accommodation unit
18 Disposal unit
19 Sheath liquid accommodation unit
20 Gate liquid accommodation unit
2 Particle sorting device
3 Particle sorting system
21 Light irradiation unit
22 Light detection unit
23 Information processing unit
24 Storage unit
25 Display unit
26 User interface

The invention claimed is:

1. A particle sorting kit, comprising:
a sample accommodation unit that accommodates a sample liquid containing particles;
a sample flow path through which the sample liquid flows;
a detection region in which a target particle is detected from the sample liquid;
a filter unit including a filter and a fitting portion that fits to an outer diameter of a tube for connection with the sample accommodation unit and/or the sample flow path, wherein
the fitting portion includes a protrusion that protrudes in a tube direction; and
the filter unit includes a tapered portion downstream of the filter and the fitting portion, the sample liquid being enclosed within the tapered portion and flows along slanted sidewalls of an internal passage of the tapered portion.

2. The particle sorting kit according to claim 1, further comprising, as the protrusion, a side surface side protrusion that protrudes in a side surface direction of the tube.

3. The particle sorting kit according to claim 2, wherein the side surface side protrusion is continuous in a longitudinal direction of the tube, and is located farther in a direction of a connection end portion of the tube with the filter unit with respect to an adhesive position at which the tube and the fitting portion are adhered.

4. The particle sorting kit according to claim 2, wherein the side surface side protrusion is continuous in a longitudinal direction of the tube, and includes a gradient to narrow an inner diameter of the fitting portion toward a filter direction.

5. The particle sorting kit according to claim 4, wherein the gradient comprises:
a first gradient connected to an inner side surface of the fitting portion; and
a second gradient connected to the first gradient and connected to a connection surface with the tube in the fitting portion.

6. The particle sorting kit according to claim 5, wherein a connecting portion between the first gradient and the second gradient is rounded.

7. The particle sorting kit according to claim 2, wherein a plurality of the side surface side protrusions is provided in one fitting portion.

8. The particle sorting kit according to claim 1, further comprising, as the protrusion, a connection surface side protrusion that protrudes in a direction of a connection end portion of the tube with the filter unit.

9. The particle sorting kit according to claim 8, wherein
an opening communicating with the filter is provided on a connection surface of the fitting portion with the tube, and
the connection surface side protrusion is provided on an entire circumference of the opening.

10. The particle sorting kit according to claim 8, wherein a contact portion of the connection surface side protrusion with the tube is rounded.

11. The particle sorting kit according to claim 1, further comprising, as the protrusion:
a side surface side protrusion that protrudes in a side surface direction of the tube; and
a connection surface side protrusion that protrudes in a direction of a connection end portion of the tube with the filter unit.

* * * * *